(12) United States Patent
Chen

(10) Patent No.: US 10,129,533 B2
(45) Date of Patent: Nov. 13, 2018

(54) HIGH QUALITY AND MOIRE-FREE 3D STEREOSCOPIC IMAGE RENDERING SYSTEM USING A LENTICULAR LENS

(71) Applicant: YTDIAMOND Co., Ltd., Taoyuan (TW)

(72) Inventor: Ying-Tung Chen, Taoyuan (TW)

(73) Assignee: Tint Mouse, Inc., Fremont, CA (US)

( * ) Notice: Subject to any disclaimer, the term of this patent is extended or adjusted under 35 U.S.C. 154(b) by 287 days.

(21) Appl. No.: 14/848,430

(22) Filed: Sep. 9, 2015

(65) Prior Publication Data

US 2017/0070727 A1    Mar. 9, 2017

(51) Int. Cl.
| | |
|---|---|
| H04N 13/04 | (2006.01) |
| H04N 13/305 | (2018.01) |
| G02B 27/22 | (2018.01) |
| G02B 5/02 | (2006.01) |
| G02B 3/00 | (2006.01) |

(52) U.S. Cl.
CPC .......... *H04N 13/305* (2018.05); *G02B 3/005* (2013.01); *G02B 3/0031* (2013.01); *G02B 5/0294* (2013.01); *G02B 27/225* (2013.01); *G02B 27/2214* (2013.01)

(58) Field of Classification Search
CPC .... G03B 21/625; G03B 21/62; G03B 21/602; G03B 21/10; G03B 21/56; G03B 35/08; G03B 35/24; G03B 21/14; G03B 21/28; G03B 21/60; G03B 21/604; G03B 35/20; G03B 35/26; G03B 37/04; G02B 27/2214; G02B 5/0278; G02B 3/0056; G02B 3/08; G02B 5/0242; G02B 5/0294; G02B 27/26; G02B 3/0031; G02B 3/005; G02B 5/0236; G02B 27/2242; G02B 27/22; G02B 27/2271; G02B 27/2285; G02B 3/0068; G02B 5/02; G02B 5/045; G02B 5/1876; G02B 5/22; G02B 27/2235
See application file for complete search history.

(56) References Cited

U.S. PATENT DOCUMENTS

| | | | |
|---|---|---|---|
| 6,064,424 A | 5/2000 | van Berkel et al. | |
| 6,801,243 B1 | 10/2004 | Van Berkel | |
| 8,408,775 B1 | 4/2013 | Coleman | |
| 8,823,890 B2 | 9/2014 | Sekine | |

(Continued)

*Primary Examiner* — Anand S Rao
*Assistant Examiner* — Samuel D Fereja
(74) *Attorney, Agent, or Firm* — Saile Ackerman LLC; Stephen B. Ackerman

(57) ABSTRACT

A three dimensional (3D) stereoscopic image rendering system uses a lenticular lens sheet with a light diffusing multi-layer, which may include an adhesive layer, formed on the external surface of its lower base. The microstructural constitution of the light diffusing multi-layer suppresses moiré patterns typically affecting the 3D images. When longitudinally directed stray light rays are internally reflected from the interior surfaces of each lenticular lens in the sheet and impinge on the light diffusing multi-layer contacting the lower base, the stray light rays are scattered diffusely into various directions, thereby significantly reducing the intensity of the moiré pattern and its effect on the image. In addition, certain related problems, such as crosstalk between left and right directed images are also reduced. As a result, the viewer perceives a high quality, moiré free, stereoscopic 3D image.

20 Claims, 12 Drawing Sheets

(56) References Cited

U.S. PATENT DOCUMENTS

| | | |
|---|---|---|
| 8,928,222 B2 | 1/2015 | Kim et al. |
| 2010/0007806 A1* | 1/2010 | Woodgate ............ G02B 5/0215 349/15 |
| 2011/0170184 A1* | 7/2011 | Wolk ................ G02B 27/2214 359/463 |
| 2011/0249093 A1* | 10/2011 | Yeh ........................ G02B 5/201 348/46 |
| 2011/0299000 A1* | 12/2011 | Woodgate ............ G02B 5/0215 349/15 |
| 2015/0140292 A1* | 5/2015 | Chen-Ho ................ B32B 3/10 428/203 |

\* cited by examiner

HIGH QUALITY AND MOIRE-FREE 3D STEREOSCOPIC IMAGE RENDERING SYSTEM USING A LENTICULAR LENS

BACKGROUND

1. Technical Field

The present disclosure relates to a three-dimensional (3D) stereoscopic image rendering (i.e., creating and projecting) system; more specifically, it is related to such a system that utilizes a lenticular lens sheet and suppresses moiré patterns.

2. Description

In recent years, three-dimensional (3D) graphical rendering devices (note, we use the term "rendering" to refer variously to the creation, presentation, display and projection of images) have received wide attention from the consumer. Products employing 3D rendering, such as gaming devices, mechanical drafting programs and medical image rendering devices, have been developed by various companies. Among the many technologies used in the implementation of these devices, the lenticular lens (or sheets of such lenses) is considered to be one of the most mature, and products using lenticular lenses can be found in flat panel televisions, notebook computers, smartphones and game consoles. Compared to the other types of 3D stereoscopic image rendering devices, the device using a lenticular lens, or more generally a sheet of such lenses, formed as a multiplicity of parallel, contiguous individual lenticular lenses, outperforms its peers mainly by its user-friendliness. Specifically, it produces a 3D stereoscopic image that is projected directly to the naked eye.

The human brain can compare the images captured by the left eye and the right eye and transmit depth data obtained from comparison of the two images to other areas of the brain where, among other things, they produce the 3D effect. Without the use of additional devices such as eyeglasses, a lenticular lens-based 3D displaying device automatically projects two different images of even a 2D object, one to the viewer's left eye and one to the viewer's right eye, for efficient use by the brain in creating a 3D effect. This unique characteristic makes a lenticular lens sheet a promising product in the next generation 3D display market.

Despite its functional advantage of naked eye viewing, the conventional lenticular lens has a fundamental drawback related to optical effects associated with its cylindrical columnar construction. Specifically, as will be described below, the conventional lenticular lens sheet can "dissipate" stray light along the lens column (hereinafter denoted as the longitudinal or Y-direction) relatively easily, in a manner analogous to the propagation of a light wave in glass fiber. Whenever there is stray light traveling in the longitudinal direction within the lens, because of the small diameter (e.g., less than 1.0 mm) and the elongated length of the lens column (e.g., tens of cm), the intensity of this stray light will be reduced by the averaging effects of multiple internal reflection processes. If typically viewed from a position perpendicular to the plane of the displaying device, the desired 3D stereoscopic image would be seen as being blended with a dim background light. The intensity of this background light is so low that it is almost undiscernible to the human eye. In reality, this background light comes from the stray light that "leaked out" of the interior of the lenticular lens column, through its surface, as the result of multiple internal reflections from the interior of that surface. Since these background light rays do not carry any image pattern, they will generally not bother a viewer. However, if there is a periodic pattern characterizing the image-producing layer that lies beneath and supports the lenticular lens sheet, the image-producing layer typically being a black, or less reflective matrix surrounding light-emitting subpixels, a vague pattern may also appear in the blended image. This is the combination of the primary 3D stereoscopic image produced by the lens sheet and the background image produced by the interaction of the stray light with the black matrix surrounding the subpixels. As a result, the problem denoted "moiré patterns" is created. To overcome this moiré problem, the conventional art has devised various means to "shunt" the occasional crossing-over between the black matrix and the lenticular lens. Van Berkel et al., (U.S. Pat. No. 6,064,424) shows one such method where the lenticular lens is placed on a displaying panel in a relatively slanted manner (denoted by the slanting angle α). Alternatively, van Berkel (U.S. Pat. No. 6,801,243) also discloses a special means of addressing the subpixels of a 3D stereoscopic image rendering device using a lenticular lens. Still further, Sekine, (U.S. Pat. No. 8,823,890) discloses a black matrix with a specific value of its width for the sake of suppressing moiré patterns. Other approaches are also taught by Coleman (U.S. Pat. No. 8,408,775) and by Kim et al. (U.S. Pat. No. 8,928,222).

Although prior art has progressed to some degree in suppressing the moiré problem, as of yet there has been no pervasive technological solution disclosed or universally adopted. For example, the prior art approach that slanted the lenticular lens column to "shunt" the encounter with the black matrix which was deemed to be the source of moiré images, may alleviate the moiré problem to some extent in that it lowers the number of the black stripes composing the black matrix that are being overlapped by the lenticular lens sheet. But the moiré problem cannot be totally cured by this prior art approach; whenever the contrast of an image is relatively high, or the total illuminance of an image is relatively high, the viewer may still occasionally observe a moiré image.

Fundamentally, the above cited prior arts are all inadequate approaches that try to suppress the impact of the stray light rays within the lenticular lens. Their inadequacies are because the light rays that really cause the moiré problem still exist. By failing to address the moiré problem from an optical engineering point of view, the prior art was merely "covering up" the problem. What is worse, after slanting the lenticular lens, the prior art that did so is then required to do the additional development work on the driving circuitry of the displaying device (e.g., liquid crystal display (LCD), organic light-emitting diode (OLED), etc.); so, the cost of manufacturing is increased. Still further, when the form factor of a displaying device is inevitably changed, as the displaying device industry is an constantly evolving industry, this prior art approach would have to devise another new type of lenticular lens sheet (e.g., differing in slant angle, pitch, radius of curvature, etc.) plus another new driver program for the image-producing layer, to meet the ever-changing engineering specifications.

Fundamentally, the state-of-the-art lenticular lens device needs a comprehensive method that addresses the moiré problem from an optical engineering perspective, i.e., a method that is based upon the fundamentals of lens design, or the effects of internal reflection. That will be the goal of the present disclosure.

SUMMARY

1. It is a first object of the present disclosure to provide a three dimensional (3D) stereoscopic image rendering system (note: hereinafter we use the term "rendering" to refer to the creation and presentation of an image to a viewer; it may also be interpreted as "projecting" an image to a viewer) using a lenticular lens sheet that has a light scattering capability. This capability will be typically provided by a thin-film or multi-layered formation on the base of the lens sheet which will suppress moiré images by using the intrinsic optical properties of the lenses, without complexities of design such as slanting the lenticular lens on the displaying panel, or multiplexing the illumination sequence of the subpixels by a specific timing plot.

2. It is a second object of the present disclosure to provide such a three dimensional (3D) stereoscopic image rendering/projecting system using a lenticular lens sheet with an adhesive layer attached underneath it, whose optical properties are optimized to allow light rays emitted from the subpixels, which are distributed on the displaying panel beneath the lens sheet in various desired patterns, to pass through the lenticular lens relatively easily (i.e., reflectivity is relatively low), whereas the light rays internally reflected back from the embossed inner surface of the lenticular lens are scattered into random directions, so that the signal to noise ratio of the 3D image can be maintained at a satisfactorily high level at all times.

3. It is a third object of the present disclosure to provide a method of manufacturing a lenticular lens sheet which is able to suppress moiré problems through the intrinsic optical properties of the lenticular lens sheet without the necessity of slanting the lenticular lens sheet relative to the displaying panel, or changing the illumination sequence of the subpixels in the panel.

4. It is a fourth object of the present disclosure to provide a method to adjust the light refracting capability of a lenticular lens sheet used in a three dimensional (3D) stereoscopic image rendering/projecting system, such that image blurring effects can be synergistically balanced against moiré pattern-caused image problems.

5. It is a fifth object of the present disclosure to suppress moiré images produced by different 3D stereoscopic image rendering systems using lenticular lenses, by adjusting the physical characteristics of a lens carrier layer on which the sheet of lens material is formed and/or an adhesive layer affixed to the carrier layer that may be used for attachment to the display layer.

6. It is a sixth object of the present disclosure to optimize the light refracting property of a lenticular lens sheet, so that the second, third, or even higher order internally reflected light rays can be effectively dispersed, whereby the 3D stereoscopic image rendered by the sheet becomes a high definition image, i.e., an image blended with only a minimal amount of noise which is generally not discernable by human eyes.

7. It is a seventh object of the present disclosure to apply a light scattering layer with equal advantageous effect to a slanted or segmented lenticular lens where it will also mitigate or eliminate moiré patterns from the projected image.

8. It is an eighth object of the present disclosure to enhance the ability of the lens structure to eliminate moiré patterns from the projected image by forming transparent light carrying channels or guides, in an adhesive layer beneath the lens sheet wherein the channels run substantially parallel to the longitudinal axes of the lenses.

The present approach will achieve the above objects by applying combined methods of physical optics, geometrical optics and wave optics. Applying these methods to the scattering of the stray light within the lenticular lens sheet caused by internal reflections from the interior lens sheet surfaces, the present approach provides a straightforward, highly effective, robust, and widely adaptable approach to manufacturing a high quality 3D stereoscopic image rendering system using a lenticular lens sheet that has the ability to significantly suppress, or even eliminate, the presence of moiré images as well as to suppress or eliminate cross-talk between left and right directed images. A further aspect of the present disclosure is to provide a method of fabricating such a moiré-suppressing and cross-talk suppressing lenticular lens sheet by forming a stray-light diffusing surface on the base of the lenticular lens sheet. This surface may be provided by a layered structure formed beneath the lenticular lens sheet and contacting its base, or by having a light-diffusing adhesive layer formed beneath the lens sheet and used both to control the intensity and angular distribution of internally reflected light and to fasten the lens sheet to an image projecting layer. Alternatively, as a further aspect of the disclosure, the lenticular lens sheet need not be fastened adhesively to the image projecting layer, but it may instead include a light diffusing plate which contacts the image projecting layer in a removable way. Such a light diffusing plate or, alternatively, an adhesive layer, is used for dispersing light rays generated by internal reflections within the lenticular lens sheet (i.e., generally first or second reflection light rays) without impeding the propagation of the primary image light rays emitted by the subpixels of the image projecting layer that ultimately form the primary left and right-directed images of the 3D stereoscopic projection. When the stray light propagating either longitudinally along, or transversely between the individual lenses of the lenticular lens sheet is intercepted by a light reflecting or scattering layer beneath the lens base, the occurrence of moiré images and the production of unwanted cross-talk will be suppressed, and the viewer will perceive a high definition, moiré free 3D stereoscopic image. The primary light rays emitted from the subpixels of the image projecting layer will also benefit from the light scattering layer in that the slightly diffused background light rays caused by the scatterings will increase the perception of overall quality of the 3D stereoscopic image rendered by the lenticular lens sheet. We note further that the carrier layer on which the lenticular lens sheet is formed is typically a layer of PET (Polyethylene Terephthalate), of from approximately 50 µm to 250 µm in thickness. The adhesive layer affixed to the carrier layer, has a thickness that falls between approximately 1 µm and 75 µm, in a further aspect of the disclosure, it may have its material composition advantageously altered by an admixture of nanoparticles (of diameter ~0.01 µM to 10 µm) such as particles of glass, poly-carbonate (PC), Poly-methyl-methacrylate, (PMMA), Polyethylene Terephthalate (PET), $Al_2O_3$, $SiO_2$ or $TiO_2$, admixed into the adhesive matrix with a density of 30% to 95% by volume.

As yet a further aspect of this disclosure, the layered structure formed beneath the lenticular lens sheet may be provided with longitudinally directed channels that will act as light-guides (see FIG. 8A) to direct internally scattered light beneath the longitudinally directed lenticular lenses. These light-directing longitudinal openings will coincide with subpixels beneath them and preferentially direct light from these subpixels along the underneath surfaces of the lenticular lenses.

BRIEF DESCRIPTION OF THE DRAWINGS

The objects, features, and advantages of the present disclosure are to be understood within the context of the Detailed Description as set forth below. The Detailed Description is to be understood within the context of the accompanying figures, wherein:

FIGS. 4A and 4B each show schematically, an exemplary layered structure as a means of illustrating light propagation effects in a stack layer based on K-M theory, while

DETAILED DESCRIPTION

Figure 1:
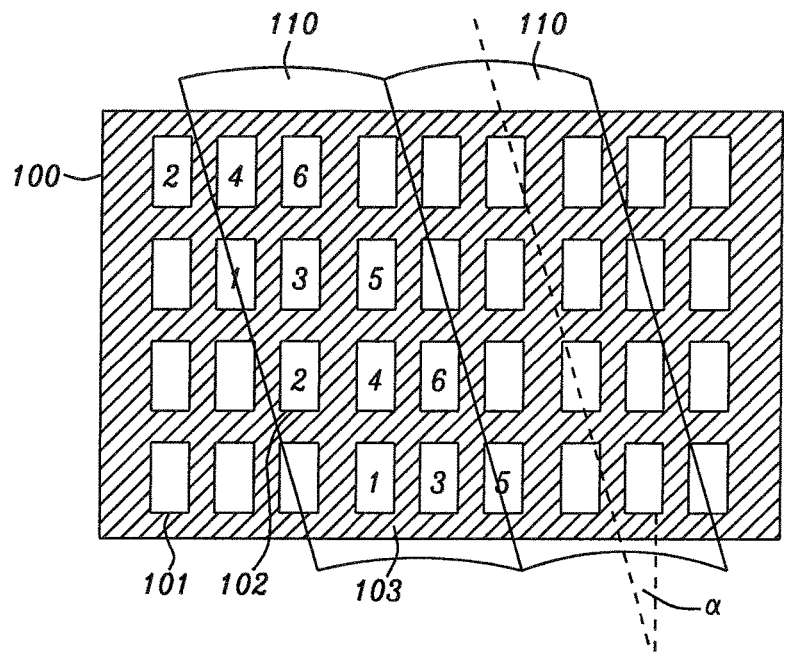
FIG. 1 shows, schematically, a prior art lenticular lens sheet placed over a collection of subpixels arranged within a black matrix. The lens is slanted relative to the matrix.

Referring first to schematic FIG. 1, there is shown a prior art approach to mitigating the moiré pattern problem by arranging a lenticular lens sheet over a light-emitting display panel at some angle relative to the panel. In this illustration, there can be seen a regular distribution of individual light-emitting subpixels indicated as clear rectangles (101, 102, 103) with the numerals, 1-6, in them. The numerals merely represent a possible firing-order of the subpixels during system operation. The subpixels are surrounded by a black matrix (100) which separates and provides a contrasting background for the subpixels. A pair (shown for simplicity) of contiguous parallel lenticular lenses (110) forming a portion of a sheet are placed over the matrix and subpixel arrangement at an angle, a, relative to the subpixels. The reason for this angular deviation is to upset the regularity of the subpixel array in the black matrix so that the effects of moiré patterns are mitigated.

Figure 2:
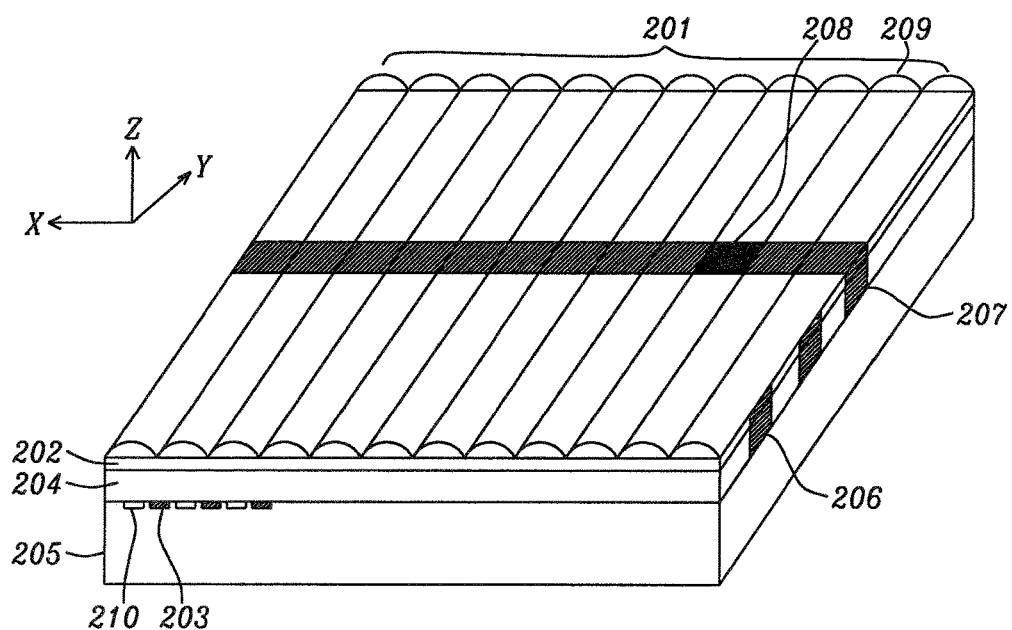
FIG. 2 shows, schematically, the essential elements of a typical prior art 3D stereoscopic displaying device using a lenticular lens sheet.

Referring next to FIG. 2, there is shown, schematically, an isometric drawing of a conventional (prior art) lenticular lens array in which the individual lens elements (hereinafter called lenticular lenses or simply lenses), are formed as a sheet of lenses, collectively denoted a lenticular lens sheet (201), and are not arranged in an angle relative to the subpixels. The essential elements used to construct such a quasi-laminar structure are, from bottom to top, the displaying device module (205), an adhesive layer (204), a carrier film (202), and the lenticular lens sheet (201). In further detail, the displaying device module (205) includes a plurality of subpixels (e.g., 210), each of which is surrounded by a black matrix (e.g., 203) similar to that which was illustrated in FIG. 1. The geometric pattern of the surrounding black matrix (203) can be extended over the entire surface area of the displaying module; hence, some of them (e.g., 206, 207) may cross beneath an individual lenticular lens (e.g., 209) and be seen as a dark patch (208). Note that the optical characteristic of the region formed by the overlap of any particular lenticular lens in the sheet with a portion of the black matrix (207) beneath it, is that the region creates a low light reflecting condition. Therefore, it appears to a viewer as though a dark patch (208) is lying beneath the particular lenticular lens (209).

Normally, a lenticular lens sheet (201) is manufactured by a process separate from that of the displaying module (205), as will be discussed further below. Upon assembling the system, a protection film (not shown in FIG. 2) will be removed from the bottom of the carrier layer (202) supporting the lens sheet to expose an adhesive layer (204) having an adhesive surface, and the adhesive (204) will be attached to the displaying module (205) to make a complete 3D stereoscopic image rendering system.

Figure 3A:
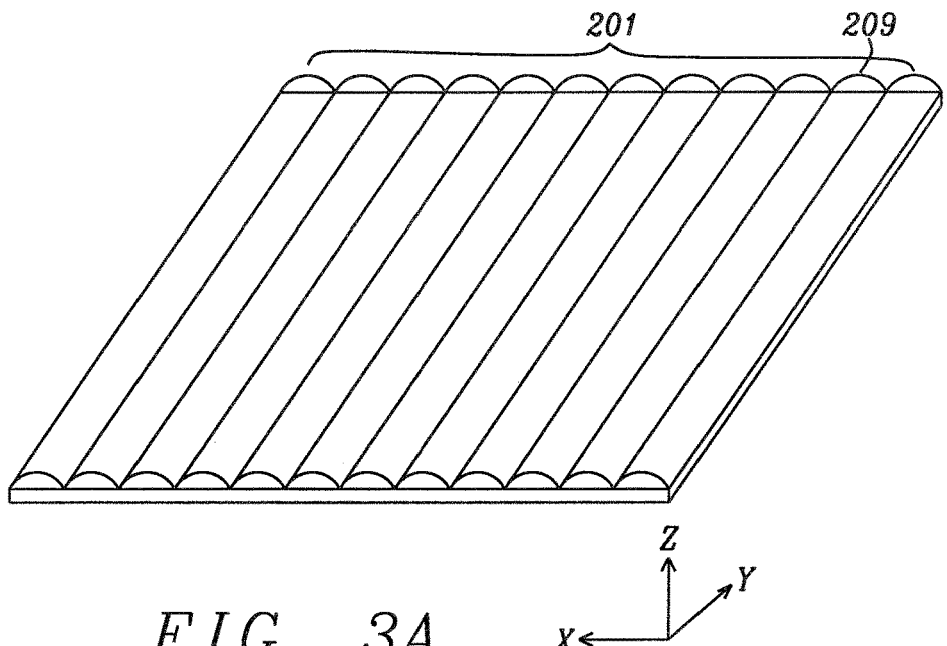
FIG. 3A shows, schematically, a perspective view of a lenticular lens sheet positioned in a 3D coordinate system (i.e., X, Y, and Z coordinate system).

Referring to FIG. 3A, there is shown schematically the finished product of the lenticular lens sheet (201). As FIG. 3A shows, a finished lenticular lens sheet is formed as a plurality of individual lenticular lenses (e.g. 209) and the entire sheet adheres to an optically transparent carrier film (202). The individual lenticular lenses in the lens sheet are semi-cylindrical in shape and are parallel and contiguous with each other. Each individual lens has a flat base and they are aligned so that the bases are coplanar. In practice, the lens sheet is formed by an embossing process applied to a layer of optical material that produces the semi-cylindrical shapes of the individual lenses.

Figure 3B:
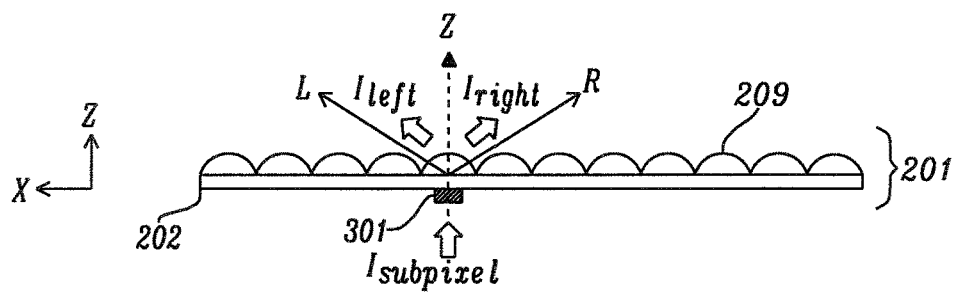
FIG. 3B shows, schematically, the cross-sectional view of the lenticular lens sheet of FIG. 3A in the X-Z plane.

FIG. 3B schematically shows an exemplary cross sectional view of the lenticular lens sheet of FIG. 3A in the X-Z plane, now being illuminated from below by a particular subpixel (301). As originally designed, the lenticular lens sheet (201) will refract light rays emitted from the subpixel (301) into two major directions in the ambient, which are denoted as the directions L and R, respectively. It is to be noted that more than two directions is permissible. In the industry, a lenticular lens sheet that can render light rays into multiple directions is often categorized as a "multi-view 3D stereoscopic image rendering system." For simplicity of the narration, the present disclosure only describes the situation where the system renders light rays to the left and right directions. When these rays L and R impinge upon the left and right eyes of a viewer, the 3D stereoscopic effect is produced for that viewer.

Assuming no light is lost by the lenticular lens sheet (201), in accord with the energy conservation principle, one may express the light flux emitted by a subpixel as follows.

$$I_{subpixel} \approx I_{left} + I_{right} \qquad (1)$$

Where $I_{subpixel}$ is the intensity of light emitted by subpixel (301) and $I_{left}$ and $I_{right}$ denote the intensity of light rays delivered into the L direction and R direction, respectively, by the lens. What FIG. 3B shows only approximates an ideal case. In fact, usually there will be some loss of light intensity as a result of internal reflections within the lens. Still further, what is lost through leakage from one lenticular lens may end up becoming stray light for the neighboring lens by entering that lens and propagating within it. In this circumstance, the light rays that are reflected by internal reflection within one lenticular lens will only be temporarily "retained" by that lenticular lens, and leaked portions of the "retained" light rays may propagate along the longitudinal direction (Y-axis of FIG. 3A or 3C) of other of the lenticular lenses in a diffuse manner (i.e. with many internal reflections). To explain the implications of this phenomenon, we must look into the general structure of a lenticular lens (209) in greater detail.

Figure 3C:
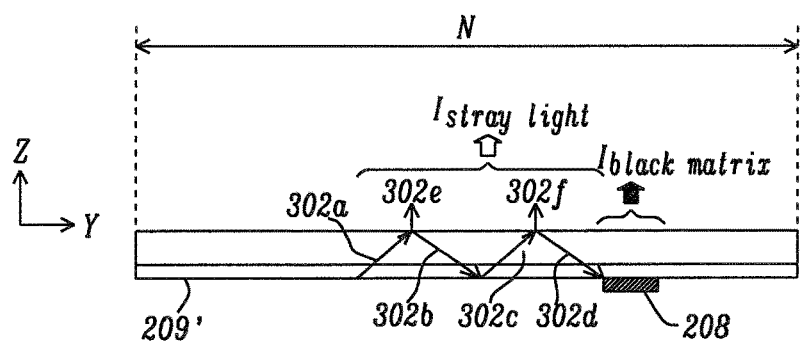
FIG. 3C shows, schematically, the cross-sectional view of the lenticular lens sheet of FIG. 3A in the Y-Z plane.

If one examines different cross-sectional views of the lenticular lens sheet (201) in FIG. 3A, the scenes are quite different in the X-Z plane of FIG. 3B and Y-Z plane of FIG. 3C. As FIG. 3B shows, in the X-Z plane, the cross sectional view of the lens sheet appears as a plurality of contiguous semi-circles (e.g., 209 in FIG. 3B); note that the semi-circular profile is an idealized and exaggerated one suitable for the present description; in a practical case, given the nature of the embossing process that produces the individual curved lenses from a flat layer of optical material, the profile may just resemble a hump of convex shape instead of a genuine semi-circle.

The separate lenses are shown juxtaposed alongside one another, combining to form the entire lenticular lens sheet (201). The perspective of FIG. 3C along the Y-Z plane is far different than that of the X-Z plane. As FIG. 3C shows, the Y-Z cross-sectional view of a lenticular lens (e.g. 209) resembles a long slender slab of generally rectangular cross-section, which is denoted (209').

Figure 3D:
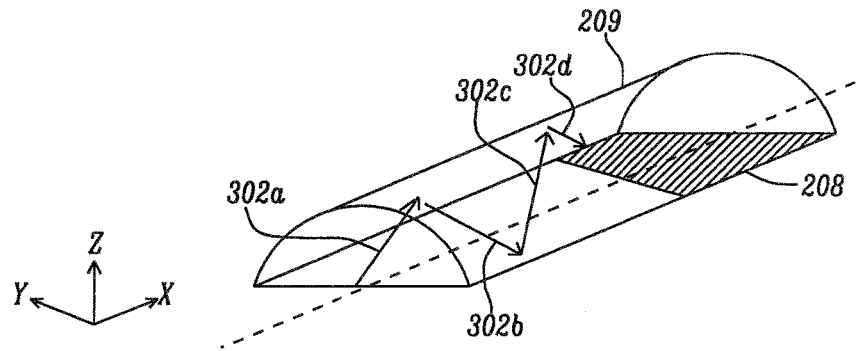
FIG. 3D shows, schematically, light propagation in a lenticular lens column being intercepted by a black matrix region of low reflectivity.

The above two different cross-sectional views and their corresponding shapes are associated with two distinctly different light propagation paths in the lenticular lens. In the perspective of the X-Z plane, the lenticular lens sheet behaves as a plurality of individual convex optical lenses, where each of the lenses serves as a classical curved-lens optical component. Each lens refracts light rays to the viewer's two eyes following Snell's Law; so we can apply our knowledge of the classical optical lens to characterize its performance in that perspective. As to the second perspective (i.e., Y-Z plane), the lens appears in longitudinal cross-section and direction (209') as a rectangular slab. From an optical engineering point view, an elongated slab (209') as shown in FIG. 3C serves as a light guide rather than a curved lens. Thus, as schematic FIG. 3D shows, whenever there is a stray light ray (e.g., arrow 302a) in the light guide, that light ray will propagate almost freely along the longitudinal direction of the light guide, which is just the lenticular lens 209.

As a result of the effects of total internal reflection (TIR), which is dependent on the refractive indexes of the lenticular lens material and surrounding air and the relatively small diameter (e.g. less than 1.0 mm) of the lenticular lens (209), the stray light (shown as arrow 302a) will bounce back and forth within the lens, from flat base to curved upper surface, which, as was said above, now acts as a light guide in the Y-direction. As FIG. 3C shows, stray light (302a) will impinge on the wall of lenticular lens (209') and a portion of the total will be transmitted into the ambient as an exiting light ray (302e) which is essentially leakage from the lens. The remaining portion of the ray will be reflected back as light ray 302b and then, in turn, reflect upward as 302c and exit as 302f. As a result of the internal reflection effect, the stray light exiting the lens usually will pass along the entire length of the light guide structure, but in a diffused manner. This leads to an averaged-out intensity of the stray light. Thus, as FIG. 3C shows, along the major portion of the lenticular lens (e.g., 209'), what is actually perceived by the viewer can be described by Eq. (2) as including the major image projection (left+right) of the subpixel mixed with a uniform ambient of stray light.

$$I_{subpixel} \approx I_{left} + I_{right} + I_{stray\ light} \qquad (2)$$

In ordinary situations, viewers will not observe the existence of $I_{stray\ light}$ because its intensity is far lower than that of the light from the nominal projected image (i.e., $I_{left} + I_{right}$). After multiple internal reflections, the intensity of the stray light rays in the lenticular lens has been smeared out to become a small and steady signal, which is superimposed onto the main image as dim background noise. Exceptional occasions may occur when there are some perturbations in the path of the stray light propagation. For example, as both FIG. 3C and FIG. 3D show, if there is a black patch (208) from the matrix surrounding the subpixels lying against the bottom plane of a lenticular lens (209), because of the low reflectivity of the black matrix surrounding the pixels and producing the patch, the average intensity level of the stray light in that region will be lowered. This can be illustrated schematically by the phenomenon shown in FIG. 3D, where light ray 302d is totally absorbed by patch 208 and there will be little or no reflected component. To the viewer's eye, when certain areas in an image generate some kind of fixed pattern that results from a slightly diminished illumination from the background light, it creates the moiré pattern and an associated problem for the viewer. So, we conclude that the moiré problem is in fact a phenomenon associated with modulated intensities of the internally reflected light propagating within the lenticular lens. Specifically, it occurs (for the viewer) when the leakage of light through the lens surface is modulated by some regularly occurring regions of low reflectivity. The total internal reflection effect (TIR) is a phenomenon that can be understood through Snell's Law, i.e., $$\frac{n_1}{n_2} = \frac{\sin\theta_2}{\sin\theta_1} \qquad (3)$$

Where $n_1$ and $n_2$ are the refractive indexes of two materials in contact with each other, $\theta_1$ is the incident angle of a light ray in medium 1 irradiating the interface of the two materials, and $\theta_2$ is the angle of refraction of that light ray in medium 2. According to the well-known Fresnel equations (not shown), when a light ray crosses an interface, according to the laws of electromagnetism a portion of the light ray will be reflected, while the remaining portion will be transmitted (assuming the portion being absorbed is negligible). As Eq. (3) predicts, there is a critical angle at which the two media produce the TIR effect (essentially all the light is reflected), and the value of such a critical angle can be calculated from Snell's Law (i.e., $\theta_{cr}$=46° for a lens material with an n value of 1.5). It is this value of $\theta_{cr}$ that tells an engineer at what incident angle a light ray will be totally reflected, or be partly reflected and partly transmitted. What we learn from Snell's law is that, based on the knowledge of the critical angle, the relative amount of a light ray being retained in a light guide (in this situation, the lenticular lens is considered as a light guide) can be controlled by the refractive indexes of the two media, lens and air, that meet at that interface (the detailed property can be characterized by Fresnel equation). For example, in ordinary situations, the refractive indexes (n) of the two media are, respectively, the n value of the lenticular lens materials (e.g., Acrylic, poly-methyl-methacrylate (PMMA); Polycarbonate (PC); Resin, Polyethylene Terephthalate (PET)), all of which are larger than 1.0 (e.g., approximately, 1.5); and the n value of air, which is unity (1.0). Since the refractive index of air cannot be changed ($n_{air}$=1), some prior art concludes that the moiré problem must be addressed by adjusting the refractive index of the lenticular lens. This, however, may not be as easy as that prior art has thought. In order to understand the complexity of the situation, one should quantitatively investigate light reflection phenomena of a slab of dielectric material (i.e., the lens in the Y-Z plane) that has an n value similar to that of a lenticular lens. Further, one side of the slab should be in contact with the air, the other in contact with a backing material of a black color.

Figure 4A:
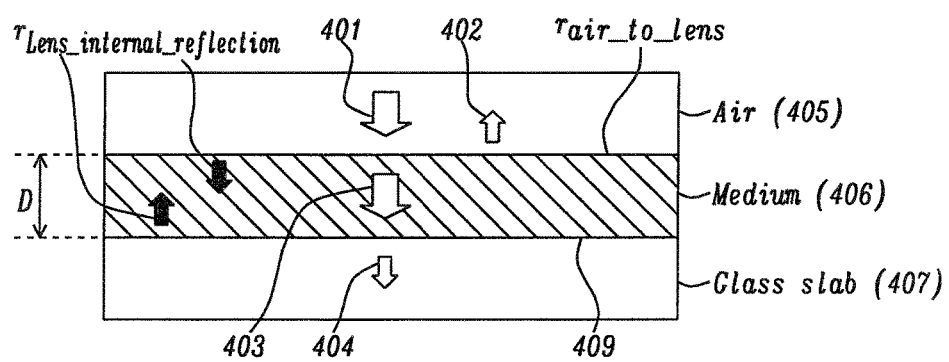
Figure 4B:
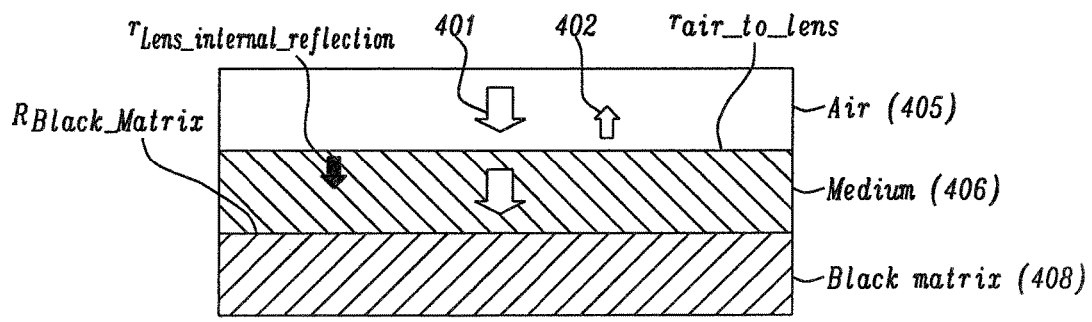

Referring now to schematic FIG. 4A, a light ray (401) is shown impinging (through the medium of air) on a material medium (406) such as a lenticular lens, which is supported by a yet another medium, a transparent glass slab (407). Through transmission and reflection, a portion of the incident light ray (401) is reflected back into the air ambient (402), while the transmitted portion of the light (403) may continue propagating toward the interface (409) between the medium and the backing material of the glass slab (407). The backing material (407) may be the transparent glass of an LCD displaying panel, which can be further divided into its subpixel region or its black matrix region. Depending on the reflectance values, one can characterize the total reflectance of the medium using a modified form of Kubelka-Munk (K-M) theory, which is known in the art. The original theory of Kubelka-Munk (K-M) was developed for the analysis of light propagation in a few parallel layers (parallel in the Z-direction) but having infinite X-Y extension. The fundamental assumptions of K-M theory are that each layer is uniform and that light distribution through a strong diffusion effect takes place inside the respective layers. When a medium is formed in that way and placed on a backing material which is either transparent or almost totally black, in accord with the modified K-M theory, the following equations (Eq's. (4) and (5)) can be used to characterize the total reflectance.

$$R_{Lens\_to\_subpixel\_region} = \quad (4)$$
$$r_{air\_to\_lens} + (1 - r_{air\_to\_lens}) \cdot (1 - r_{Lens\_internal\_reflection})$$
$$\frac{r_{Lens\_internal\_reflection} \cdot e^{-2kD}}{1 - r^2_{Lens\_internal\_reflection} \cdot e^{-2kD}}$$

$$R_{Lens\_to\_Black\_Matrix} = \quad (5)$$
$$r_{air\_to\_lens} + (1 - r_{air\_to\_lens}) \cdot (1 - r_{Lens\_internal\_reflection})$$
$$\frac{R_{Black\_Matrix} \cdot e^{-2kD}}{1 - r_{Lens\_internal\_reflection} \cdot R_{Black\_Matrix} \cdot e^{-2kD}}$$

Where $R_{Lens\_to\_subpixel\_region}$ and $R_{Lens\_to\_Black\_Matrix}$ denote the total reflectance of the medium where it is placed on the subpixel region and black matrix region, respectively. The factor $r_{air\_to\_lens}$ denotes the reflectance of the interface between air and the medium, $r_{Lens\_internal\_reflection}$ denotes the internal reflectance of the medium, or the reflectance between the medium and the transparent glass slab (for simplicity of narration, we assume its n value is close to 1); D is the thickness of the medium, k is the absorption coefficient of the medium, and $R_{Black\_Matrix}$ denotes the reflectance of the black matrix.

We can simplify the analysis, as the first item on the right of Eq. (4) and (5), i.e., $r_{air\_to\_lens}$ can be set as a constant. When a material medium (e.g., PMMA) is selected for a lenticular lens body, the quantity $r_{air\_to\_lens}$ is fixed. In our analysis, it is the parameters $R_{Black\_Matrix}$ and $r_{Lens\_internal\_reflection}$ that cause the results of Eq. (4) and (5) to change. These parameters vary in value in accordance with the manufacturing processes, e.g., lens positioning, radius of curvature, height of a lenticular lens, etc. In the black matrix region, the value of $R_{Black\_Matrix}$ is significantly lower than $r_{Lens\_internal\_reflection}$ (i.e., $R_{Black\_Matrix}$~0). On the other hand, in the region where the medium contacts a transparent layer of glass, the second term of Eq. (4) is influenced by two parameters, i.e., $r_{Lens\_internal\_reflection}$ and the optical propagation distance, $e^{-2kD}$, respectively. Thus, one concludes that that the moiré problem is indeed complex, involving, among other factors, the refractive index of the lens material, light scattering effects, illumination conditions, and geometrical shape of the lenticular lens. In order to devise the methods for reducing the intensity of stray light, we will trace light rays that are reflected or refracted from the respective interfaces.

Figure 4C:
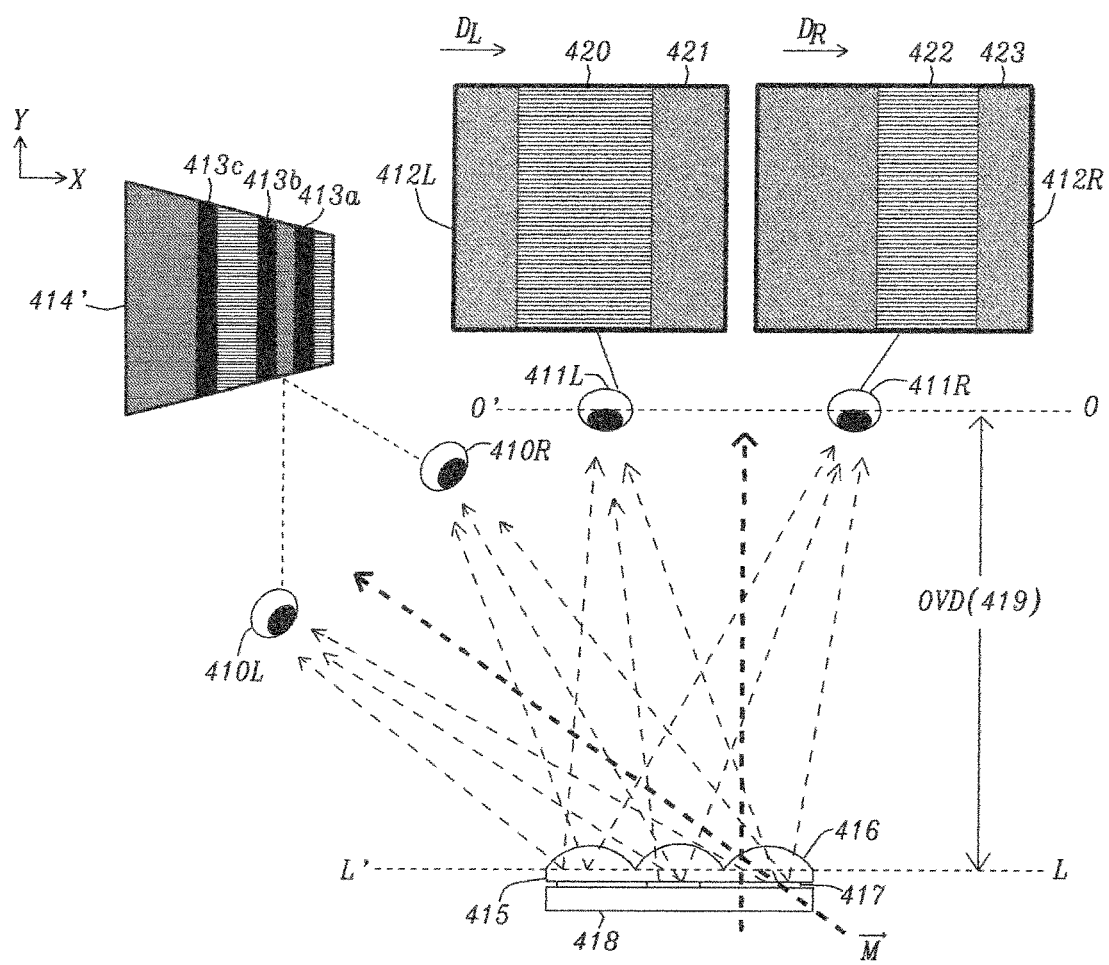
FIGS. 4C and 4D are realistic examples of how these effects appear to a viewer.

FIG. 4C provides a realistic example showing that a 3D stereoscopic background image carries a low intensity (dim) pattern (i.e., a moiré pattern) when the TIR effect is manifested at certain perspective angles. As FIG. 4C shows, an LCD panel (418) is attached to a lenticular lens sheet (416) and its carrier film (415), creating an array of subpixels (417) beneath the lens sheet. As a result of the optical properties of the lenticular lens (416), light rays emitted by the subpixels (417) are projected to an envisioned plane ($\overrightarrow{OO'}$), which is located at a distance, OVD (419), vertically above the LCD panel (418) and generally parallel to the LCD plane (i.e., the normal vector $\vec{N}$ is perpendicular to both planes $\overrightarrow{LL'}$ and $\overrightarrow{OO'}$, respectively). As FIG. 4C further shows, image (412L) and (412R) are the two real images (i.e., they may be captured by digital cameras) formed in viewer's left eye (411L) and right eye (411R). In this example, we imagine the object being projected is a few parallel stripes. The stripes could be in two different "colors" (e.g., red and blue) but, for clarity, they are here shown as having different shadings (420, 421, 422, 423), but are rendered by the LCD panel (418). When light rays emitted by the LCD panel are refracted by the lenticular lens sheet (416), two slightly different images are projected onto the viewer's left eye and right eye, which are denoted by (412L) and (412R), respectively. Note that these two images themselves are substantially identical, but there is a lateral displacement between them. Specifically, the edges of the two stripes of different shadings are located at different lateral distances from the left edge of the respective image frame (i.e., $D_L$ and $D_R$; in this case, $D_L < D_R$). If the LCD panel (418) were rendering an object having a realistic profile (e.g. a house, bird, or a human, etc.) instead of simply stripes, the image of that object will appear to have a stereoscopic effect for the observer. One may also notice that there is nothing but the stripes lying in the images. In other words, at this viewing angle (denoted by vector $\vec{N}$), both images (412L') and (412R') are free of moiré. The situation changes, however, when the TIR effect comes into play. This can be demonstrated by changing the perspective angle, which is denoted by the angled axis $\vec{M}$ in FIG. 4C. In the present example, the angle between the vectors $\vec{N}$ and $\vec{M}$ is about 46 degrees. When viewing a 3D stereoscopic image rendered by a lenticular lens from this perspective angle, the TIR effect will prevent many light rays from reaching the viewer's two eyes because they have been reflected back by the surface of the lenticular lens body. Thus, as FIG. 4C shows, black stripes (e.g., 413, etc.) appear in the real 3D stereoscopic image (414) which is seen by the two eyes together. Note that there are several black stripes (i.e., 413a, 413b, and 413c) in the stereoscopic image frame (414). Of course, the above phenomenon is not a coincidence (i.e. all the three black stripes appear at a same perspective angle 46 degrees). The physical justification for this phenomenon is explained as follows. In the above demonstration, we have assumed the use of a dielectric material (i.e. PET) whose refractive index value is about 1.5. By Snell's law, for such a material, the corresponding TIR effect will take place at a critical angle of about 46'. In the present demonstration, such an angle is denoted by the intersecting angle between vectors $\vec{N}$ and $\vec{M}$.

Figure 4D:
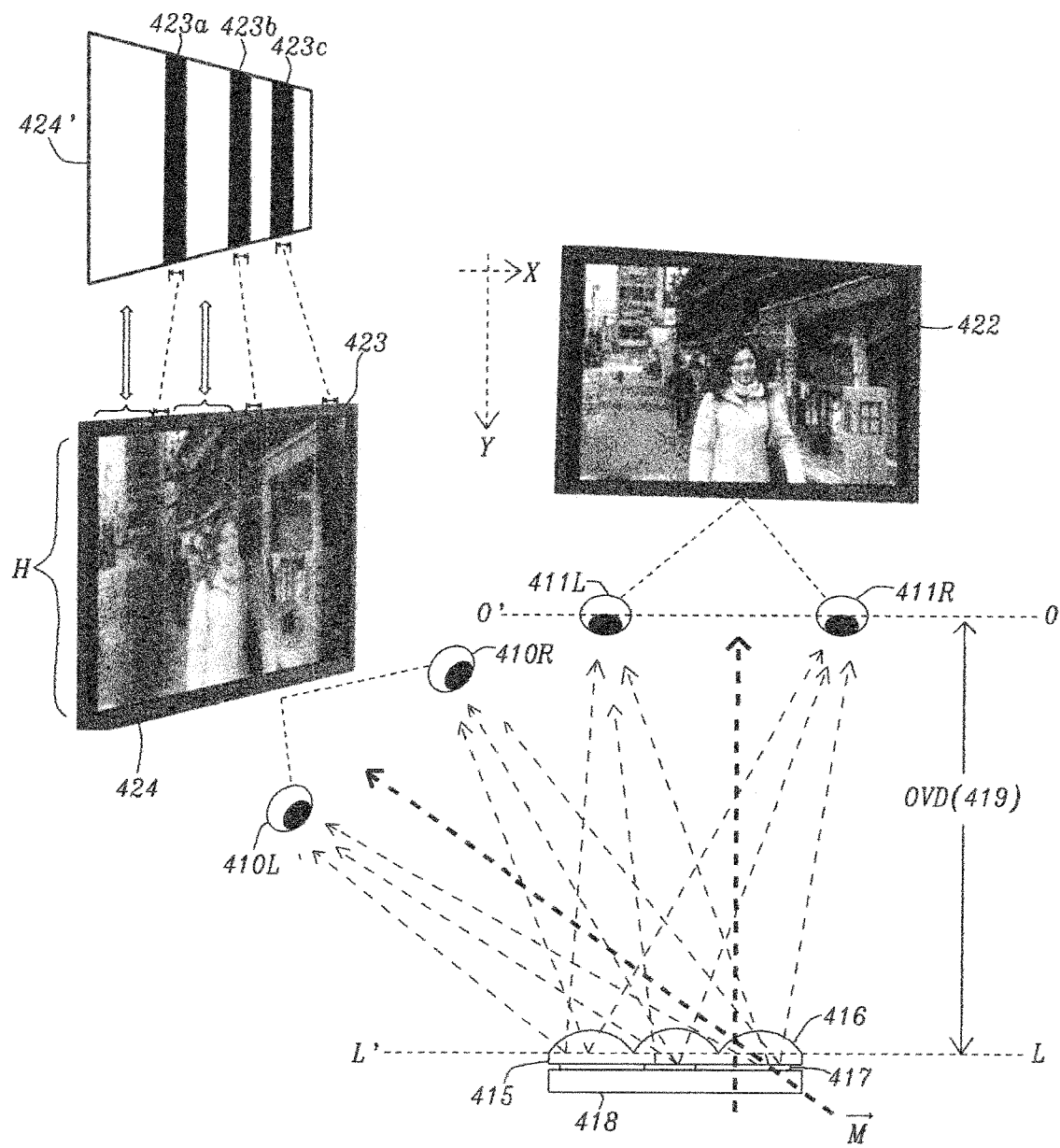

In the present example, there is another phenomenon that worth our attention—these black stripes are all aligned in the same direction, parallel to the Y axis of the 3D stereoscopic image plane (414), which is into the figure plane. This phenomenon is not a coincidence, either, as the Y axis is the longitudinal direction of the lenticular lens sheet (416). One may notice that throughout the entire height (H) of the image plane (414), there is no black stripe that crawls in the X axis direction. The above stated phenomenon confirms fundamental physics—in a practical case, a lenticular lens acts more like a light guide along its longitudinal direction. Thus, light rays that propagate along the longitudinal direction may proceed with few perturbations. FIG. 4D illustrates, schematically, another realistic exemplary case, in which a lady's portrait is rendered by an LCD panel attached to a lenticular lens sheet, whose components are similar to those of FIG. 4C (e.g., (418), (417) and (416), etc.). In practice, the lady's portrait also projects a left eye view and right eye view. This means that the profile of the lady (422) in FIG. 4D will have different lateral displacements in the left and right eye images. To avoid causing confusion to the readers, FIG. 4D only shows one eye's image. Note that when the perspective angle changes from 0 degrees to about 45 degrees, several black stripes appear (423a, b, and c) in the respective images (424'). This is a clear evidence that moiré pattern may appear in a live 3D stereoscopic video when the effect of TIR is manifested in a lenticular lens. We will now proceed to a more detailed description of how the moiré pattern is caused by the succession of TIR light rays that proceed longitudinally through a lens.

Figure 5A:
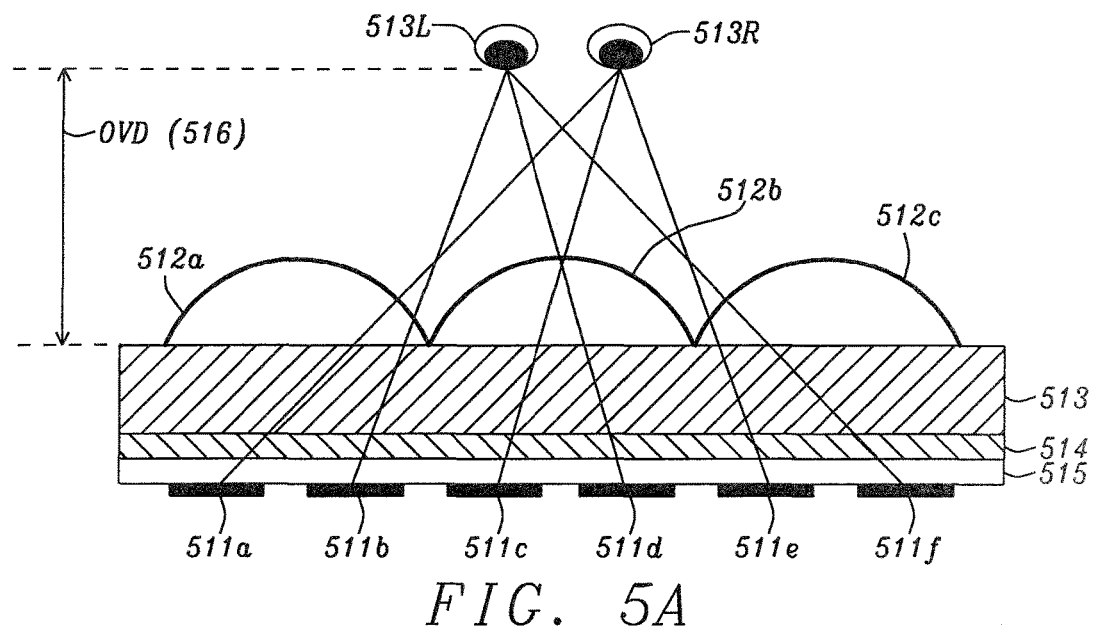
FIG. 5A shows, schematically, several exemplary light propagation paths to a viewer's left eye and right eye whose trajectories are being refracted by the present lenticular lens sheet.

FIG. 5A schematically shows the traces of light rays that are emitted from subpixels (e.g., 511 a, b, c, d, e, and f), and then pass through lenticular lenses (512a, b, and c). These light rays subsequently impinge onto the viewer's left eye and right eye (i.e., 513L and 513R) at an optical vertical distance, OVD, (516) from the lens.

Figure 5B:
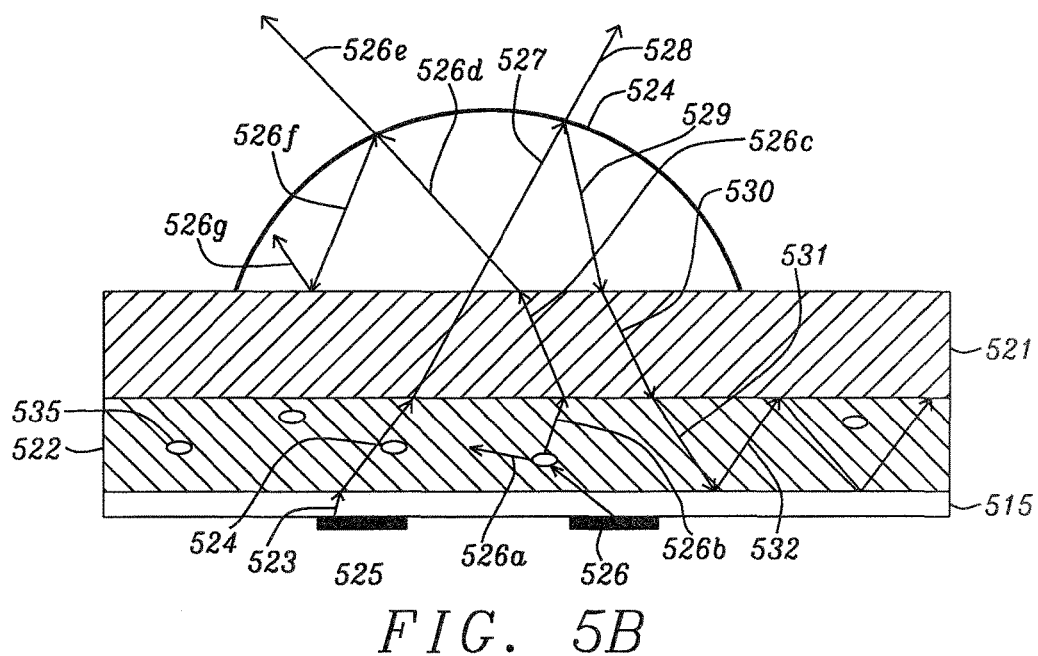
FIG. 5B shows schematically, the traces of first (e.g., 526f, or 529, etc.) and secondary reflected light rays (e.g., 532) in a lenticular lens sheet.

We analyze the performance of a single lenticular lens (524) in schematic FIG. 5B. The traces of the light rays (523) that are directly emitted from the subpixel (525) are first identified. Thereafter, these light rays will pass through the adhesive layer (522), the carrier layer (521), and finally pass through the lenticular lens (524). Upon experiencing internal reflection at the air/lens interface (i.e., the embossed curved convex surface of the lenticular lens), the intensity and direction of the internally reflected light ray (529) will be changed compared to the direction of the rays just emitted from the subpixel; we call light ray (529) the first reflection light ray. The incident light ray (527) will become two light rays which are denoted as (528), a transmitted ray and (529), a reflected ray, respectively. Depending on the number of times a light ray crosses the respective interfaces, the reflected light rays can be categorized as first reflection light rays (e.g., 529, 526f, etc.), second reflection light rays (e.g., 532, 526g, etc.), etc. Still further, if there are nanoparticles in the adhesive layer (e.g., 535), light scattering effects at these nanoparticles will also occur. In this situation, the scattered light rays will be denoted as 526a and b. In a 3D stereoscopic image, the main image seen by the viewer is nearly entirely constructed by the refracted light rays (526e, 528, etc.). A dimmed (reduced intensity) background illuminance is often intermixed with the primary image rays due to emission through the lens surface, of light rays that have been subjected to multiple internal reflection(s) and secondary reflections. In the following sections, methods for eliminating the moiré problem will be developed based on the understanding acquired from the above light ray tracing techniques.

A method for fabricating a lenticular lens sheet that meets the present objects will be described in Embodiment 1. A method for achieving the highest ratio of the luminance of the main image to that of the background is provided in Embodiment 2, and a method for including a light diffusing plate, instead of an adhesive layer, for suppressing moiré patterns will be provided in Embodiment 3. However, we will first address some specific methods for dealing with aspects of the moiré problem as well as certain other problems associated with the optical properties of the lenticular lens sheet.

(1) Moiré Suppression

This section discloses methods for suppressing moiré images based on the physics discussed in the above sections. Specifically, from Eq. (4) and Eq. (5), we can use the following three methods to suppress the patterns in the intensity of stray light (i.e., $I_{stray}$ light of FIG. 3C) propagating in a lenticular lens, so that the moiré image resulting from those patterns is no longer discernable to the viewer. The following three prescriptions will effectively address the moiré problem by reducing or eliminating the propagation of stray light longitudinally along the lenticular lens elements and, thereby, also eliminate variations in light leakage through the lens surface resulting from areas of reduced reflectivity beneath the lenses.

(i) Change the refractive index of the lenticular lens material. This method has the effect of changing the critical angle of total internal reflection, so that the intensity of first and secondary reflected light rays, or even higher order ones, can be reduced.

(ii) Add a light scattering layer/surface to the bottom plane of the lenticular lens sheet. Such a surface has the ability of intercepting and disrupting the propagation paths of stray light, so that the net amount of the stray light propagating along the longitudinal direction of the lenticular lens will be reduced;

(iii) Select an adhesive (e.g., OCA, pressure sensitive adhesive, PSA; etc.) material for fastening the lens sheet to the light generating layer that incorporates an internally blended light scattering component (e.g., a mixture of nanoparticles), or has a unique molecular bonding structure characteristic of the adhesive material itself, so that a light diffusing effect can be produced or enhanced;

As can be understood from Eq. (4) and (5), some of the above methods are equivalent to changing the reflectance of the backing material, some are equivalent to changing the $r_{air\_to\_lens}$.

The present disclosure generally addresses the moiré problem by adding a light scattering layer or similar feature to the lenticular lens sheet; namely, a layer or feature that has the ability to reduce the effective light propagation paths (i.e., enhance the effect of $e^{-2kD}$) within the lenticular lens. This allows the design of a device structure and an associated manufacturing method for lenticular lens devices that meet the present object of moiré pattern elimination and crosstalk reduction as well as providing additional advantages in optical quality to be discussed below.

Figure 6A:
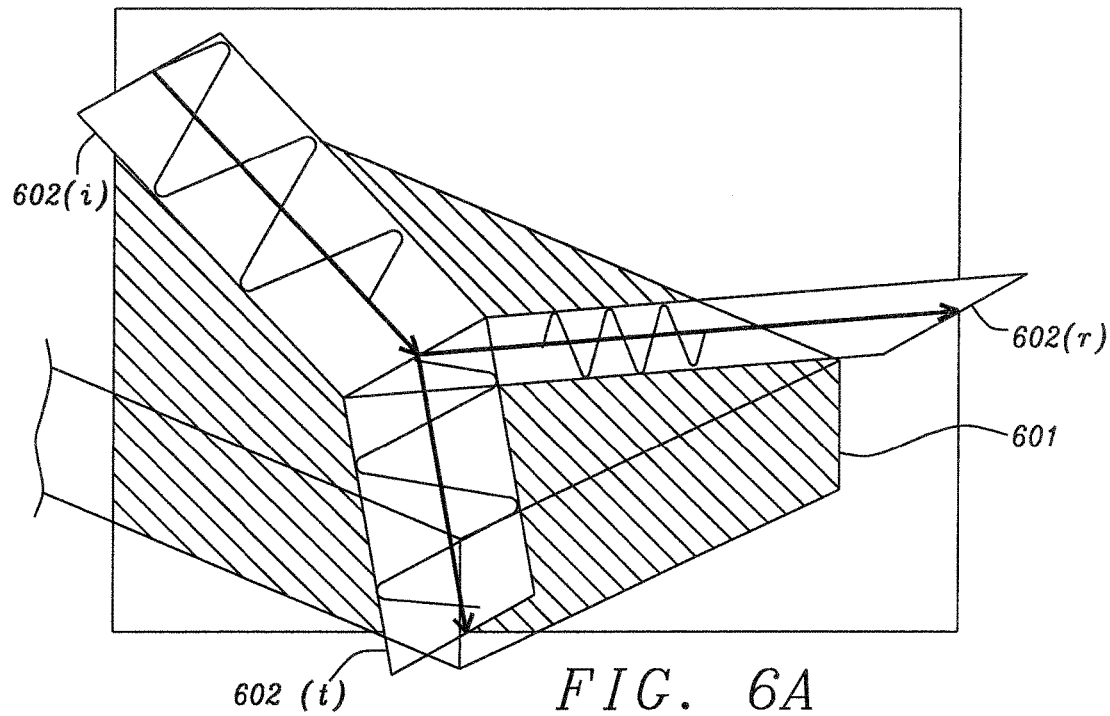
FIG. 6A shows schematically, that the polarity of a reflected light ray can be affected by the polarized ingredient (e.g., dipole bonds) in the medium.
Figure 6B:
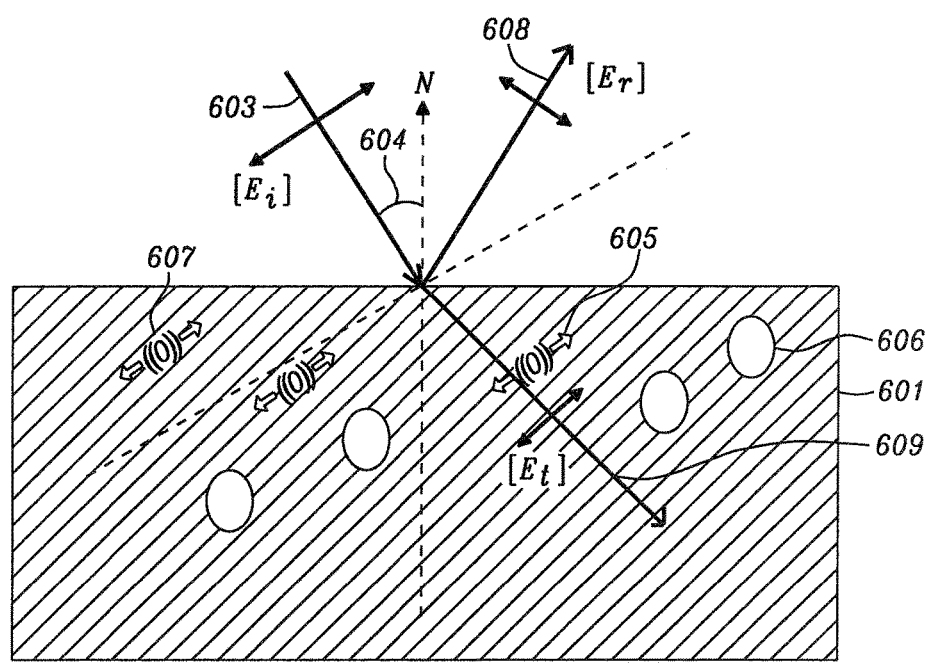
FIG. 6B shows schematically that the intensity of a polarized light beam is largely determined by the incident angle of the light ray relative to the normal vector, N, of the surface of a medium, and to the principal directions of dipole movement (e.g., direction of vibration, 605) within a material (e.g., an adhesive).

Using Eq. (4) and (5) and Snell's Law, schematic FIG. 6A shows how a layer of material (601), such as an adhesive layer with a specific refractive index value, can be advantageously deposited on the bottom surface of a lenticular lens sheet. Such an adhesive layer (601) will cause the intensity of the secondary reflected light rays (602($r$)) to change (and be polarized as well). This figure shows the reflection of a first internally reflected light ray, 602($i$), that was previously internally reflected by the embossed surface of the lenticular lens, and, after transmission back through the lens body, was subsequently again reflected, 602($r$), by the interface between the base of the lenticular lens and the adhesive layer (601). FIG. 6B shows the rays of the waves in FIG. 6A in a side view.

A more detailed description of the light dispersion process in a lenticular lens was already previously explained by reference to FIG. 5B. When the refractive index of the layer of material deposited on the lens base, such as an adhesive layer (522), is higher than that of the lenticular lens (524), but lower than that of the glass material of the flat panel light generating display (515), light rays emitted from the display subpixels (525) will pass through the adhesive layer relatively easily. On the other hand, light rays internally reflected by the lenticular lens surface will be further internally reflected by the adhesive layer (522). If we manage to reduce the intensity of secondary reflected light rays (e.g., 602 ($r$) in FIG. 6A), the net amount of light flux retained in the light guide of the lenticular lens and perceived as the intensity of background light appearing in the projected 3D image, will be reduced, and will be averaged out to become a relatively steady level of background signal. In the meantime, the intensity of the primary stereoscopic image projected to a viewer's eyes is largely intact. As a result, a high quality and moiré free stereoscopic 3D image is provided.

As schematic FIG. 6B shows in detail, when the adhesive material (601) is composed of a plurality of materials instead of a single dielectric material, so that the adhesive material is a composite material, or a co-polymer, whose matrix is further blended with a plurality of nanoparticles (606), such as nanospheres, or nanoglass beads, the amount of light flux dissipated along the longitudinal direction of the lenticular lens sheet can be even further reduced by the scattering effects of the nanoparticles. This reduction is largely attributed to the concentration of nanoparticles (606), although other features such as microstructures (607) in the composite material may also have a role to play. From this knowledge, we conclude that there is the capability of providing a unique adhesive material (e.g. optically clear adhesive, OCA, optically clear resin, OCR, etc.) embedded with nanoparticles or similar optical scatterers. The optical performance of such a material can balance transmission and scattering, two effects in a 3D stereoscopic image rendering system using a lenticular lens sheet. A method to be discussed below provides a general design rule for fabricating a lenticular lens sheet which is able to suppress the moiré problem by addressing both the transmission and scattering processes in a lenticular lens sheet.

FIG. 6A shows schematically the polarization of a light ray that impinges on an interface between a lenticular lens (not shown) and a light scattering layer (e.g., a layer of adhesive material, (601)). Because adhesive material (601) is primarily designed for fastening purposes, most of the adhesive materials are composed of molecules with a large number of dipole bonds (e.g. (607) in FIG. 6B). According to electromagnetic theory, light waves (here represented, for simplicity, as rays (603)) will propagate through a material having many molecules with dipole bonds in accordance with their vibrational properties (605). As a result, there is a Brewster's angle (604) for an incident polarized light ray (602($i$)), greater than which the incident polarized light wave is not transmitted. Note that most of the light rays emitted by the flat panel display are polarized, so to be totally transmitted through an intervening medium, which is the adhesive layer (601) in this case, no light ray can be reflected back (608) into the lenticular lens material, so $[E_r]_1 \sim 0$. Thus, the intensity of a reflected light ray from an incident light ray polarized parallel to the layer surface is approximately zero. In the above situation, the intensity of the transmitted light ray (602($t$)) is equivalent to that of the incident light ray (602($i$)). In accord with electromagnetic theory, Brewster's angle (604) is dependent upon the refractive index of the two interfacing materials, i.e., the adhesive material (601), and the lenticular lens material. When the effect of Brewster's angle (604) is manifested, the intensities of the light rays generated by the secondary reflection effect (i.e., the intensity of reflected light ray 602($r$), or, $[E_r]_1$)) is effectively minimized. Thus, light rays internally reflected by the embossed surface of the lenticular lens (i.e., the first reflected light rays (527) in FIG. 5B) will all be transmitted through the adhesive material (i.e., $[E_r]_1 \sim [E_t]_1$). Knowing this property, a certain density of nanoparticles (606) can be added to the adhesive material matrix and their refractive index, size, shape, etc. specifically controlled for scattering the transmitted light rays (609) effectively. After multiple scatterings, the intensity of the second reflection light rays will be by averaged out, generating a reduced intensity set of reflected rays that goes in all directions (is isotropic). When these reduced intensity, isotropically distributed background light rays are superimposed on the main projected image, the total 3D stereoscopic image provided by the presently disclosed lenticular lens system will be that of a high definition system, as the main image is mixed with only a very low amount of background illumination. Therefore, the moiré image, if it ever existed, is now suppressed. Note that the nanoparticles (606) may produce a side-effect on the light rays directly emitted by the subpixels—they may slightly scatter those light rays (denoted by 526$a$ and 526$b$ of FIG. 5B). An image suffering from this scattering phenomenon will be slightly blurred.

Fortunately, only a very low density of nanoparticles is necessary to achieve the required scattering to eliminate the moiré image. By controlling the density of the nanoparticles (606) embedded in the adhesive material and specifying the thickness of the adhesive layer (601), the undesirable side-effect of blurring can be managed and reduced to a low level.

In fact, light rays emitted from the subpixels can also benefit from the effects of the nanoparticles. Specifically, a slightly diffused light ray, resulting from the nanoparticle scattering, can be directed from the subpixels to the lenticular lens sheet, which in turn increases the overall uniformity of the 3D stereoscopic image as perceived by the viewer. As a quantitative explanation, the level of viewer satisfaction with a 3D stereoscopic image can be characterized by the "optical artifact" of Eq. (6):

$$\text{optical\_artifact} = \frac{\text{luminance\_of\_un-desired\_image}}{\text{luminance\_of\_desired\_image}} \quad (6)$$

As Eq. (6) demonstrates, when the luminance of the stray light is smeared out to become dimmed (of low intensity), the parameter that denotes the "optical artifact" can be suppressed to a very low value, which justifies the essential advantages of the present method.

(2) Crosstalk Reduction

In the previous section (1) directed at suppressing moiré patterns, we were literally manipulating the reflectivity of the bottom plane of the lenticular lens sheet to prevent the stray light rays from diffusing back into the lenticular lens in any one particular direction, i.e., to maintain an isotropic distribution of multiply reflected rays. More specifically, we are reducing the propagation of stray light rays in the longitudinal direction of the lenticular lens (i.e. Y-axis of FIG. 1) to obtain a corresponding reduction of light that is modulated by the black matrix.

In this section, we will address stray light rays that execute multiple reflections in the X-Z plane, i.e., the cross-sectional plane of the lenticular lens. Referring back to schematic FIG. 3C, theoretically, the secondary reflected light rays (302e and will be reflected into the Z direction and impinge on either the L (left) or R (right) eye of the viewer. Of course, what is most desired is that there be no internal reflection at all, so the condition as depicted by Eq. (1) can strictly hold. However, in practice, there will be many internal reflections, and the stray light rays produced by the internal reflections will travel in all directions. Thus, we have to modify Eq. (1) as follows.

$$I_{subpixel} \approx I_{left} + I_{right} + I_{stray\ light\ in\ Y\text{-}Z\ plane} + I_{stray\ light\ in\ X\text{-}Z\ plane} \quad (7)$$

Where $I_{stray\ light\ in\ Y\text{-}Z\ plane}$ denotes the intensity of stray light in Y-Z plane, and $I_{stray\ light\ in\ X\text{-}Z\ plane}$ denotes the intensity of stray light in X-Z plane. That is, the stray light portion $I_{stray\ light}$ as it appears in Eq. (2) can now be divided into two parts, such that, $$I_{stray\ light} \approx I_{stray\ light\ in\ Y\text{-}Z\ plane} + I_{stray\ light\ in\ X\text{-}Z\ plane} \quad (8)$$

It is the first term on the right of Eq. (8), i.e., $I_{stray\ light\ in\ Y\text{-}Z\ plane}$, that relates to the cause of the moiré problem, whereas it is the second term on the right, i.e., $I_{stray\ light\ in\ X\text{-}Z\ plane}$ that relates to the production of crosstalk.

This section specifically addresses that crosstalk. The previous section dealt with suppressing the moiré problem and we saw that it is the length of a lenticular lens (i.e., G of FIG. 7B) that matters the most to producing moiré patterns. By intercepting the propagation paths of internally reflected rays along the Y-axis, one acquires the capability of effectively controlling the effect of the length factor G.

Figure 7A:
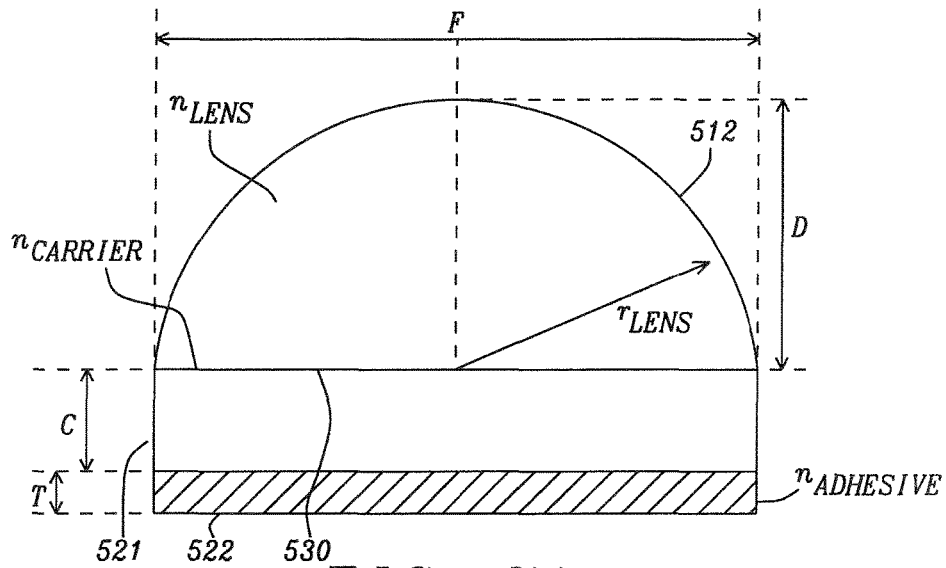
FIG. 7A shows schematically, the generic design rule of the presently disclosed lenticular lens sheet.
Figure 7B:
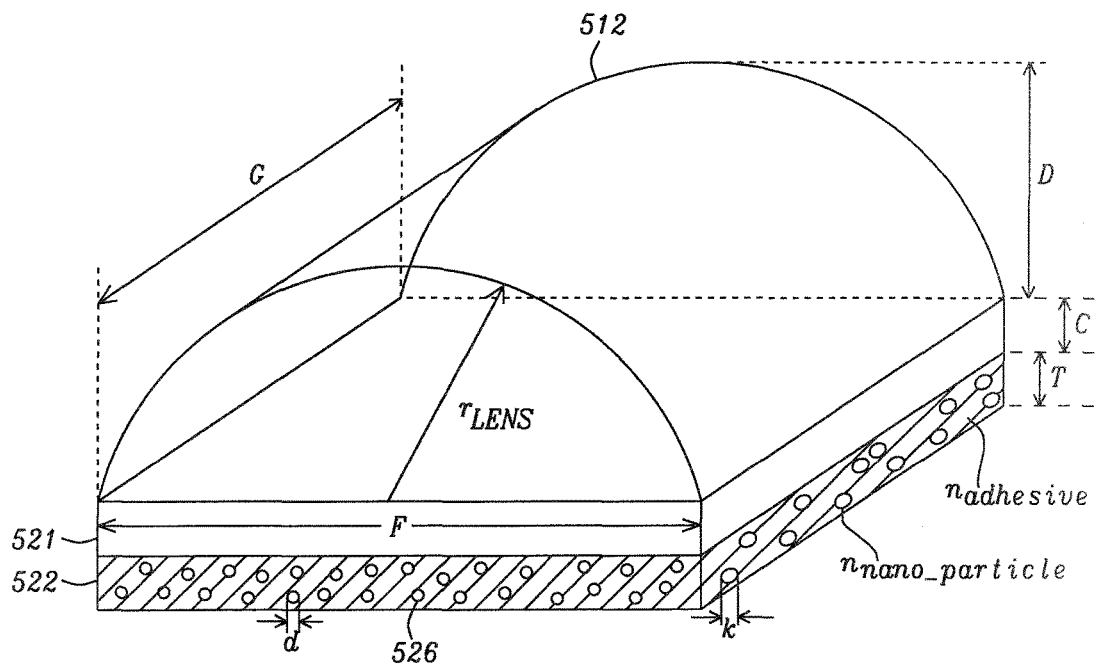
FIG. 7B shows schematically, the design rule of the presently disclosed lenticular lens sheet with light dispersing nanoparticles blended in the adhesive layer.

In the current section, we note that it is the width, i.e., the factor F of FIG. 7B, that matters the most for crosstalk. Of course, the effect of these two parameters, F and G, is interrelated. Therefore, when doing design and process integration, both parameters should be dealt with concurrently. This design rule of concurrence provides a way to balance the performance of the lenticular system with respect to both moiré and crosstalk, as well as to address ancillary problems such as image blurring. For example, the lenticular lens can be formed in an island shape of length G' rather than a columnar shape of length G, where G'<total length G of lenticular lens, and G'>length of a subpixel. Further, one can determine the aspect ratio of a lenticular lens segment in an island formation to optimize the effectiveness of suppressing both moiré and crosstalk phenomena. In these respects, the mechanisms for suppressing moiré and reducing crosstalk are somewhat alike in that they both can address the effects of stray light rays by adding an adhesive layer with specific refractive index values and density of internal nanoparticles. However the aspect ratio, of F to G, has a different effect, and the effects must cooperate with one another to achieve the respective design and performance goals.

Other than by adjusting the aspect ratio, to suppress moiré patterns one may add more than a minimally sufficient density of nanoparticles to the adhesive material. On the other hand, for reducing crosstalk, the amount of added nanoparticles should be barely minimal, so that no third or higher ordered reflected light rays occur. One can compare Eq. (4) and Eq. (5) to get a better understanding of this balance.

To deal with the crosstalk issues, the present approach is to simultaneously reduce the stray light that goes to the left eye and right eye. In practice, this would require the stray light rays that have entered the adhesive layer to be reflected back to the lenticular lens as an averaged out background light in the X-Z plane. An effective way of doing this is to "detain" the light rays within the nanoparticles (526) by total internal reflections. As schematic FIG. 7B shows, the diameter, d, of the nanoparticles and their refractive index, i.e., play a dominant role in total internal reflections along with the optical properties of the surrounding medium. Hence, the interplay between the polar nature of the adhesive material itself (i.e., $n_{adhesive}$), and the optical property of the nanoparticles blended inside the material (i.e., the refractive index, size, and geometrical shape of the nanoparticles) have a major impact on the crosstalk problem. In the most desirable situation, the refractive index of the nanoparticles should be higher than that of the surrounding adhesive material (i.e., $n_{nano\_particle} > n_{adhesive}$). By specifying this relationship correctly, we produce a situation that creates a total internal reflection (TIR) effect within the nanoparticles themselves, so the crosstalk issue can be addressed in that way.

The above method can be used to manipulate the relative intensity of stray light per unit area (flux) in the 3D stereoscopic image observed by the viewer. If one wishes to control the relative intensity of stray light flux so that it is close to that of the primary 3D images, we can adjust the width of the lenticular lens (F of FIG. 7B). As FIG. 7B shows, when the width of a lenticular lens is increased, and the area in contact with the subpixels is kept constant, the effective area (i.e., the product F×G) that can be used to scatter stray light is increased proportionally. Naturally, in a 3D stereoscopic image rendering device it would be desirable that the 3D image presented to the viewer's two eyes are not intermixed (i.e., there is no crosstalk). Reducing the stray light rays is a very effective means of meeting this goal.

To reiterate, the present approach has made effective use of the relationship between the undesirable moiré and crosstalk problems to deal with them both, but indeed their subtle physical contexts are different as are the engineering approaches to deal with them most effectively.

(3) Performance Assessment of the Lenticular Lens as an Optical Lens Module

In previous sections (1) and (2), the performance of the disclosed lenticular lens device has been addressed in terms of its capabilities to provide moiré suppression and crosstalk reduction. In this section, we will assess the overall performance of a lenticular lens sheet as a classical optical lens module. This analysis will address the capability of a lenticular lens to render stereoscopic images effectively to the viewer's left eye and right eye. From the point of view of thin-lens optics, the focus of a thin lens can be determined by equation (9).

$$\frac{1}{f} = (n-1)\left(\frac{1}{r_1} - \frac{1}{r_2}\right) \quad (9)$$

Here f denotes the focal length of the lens, n denotes the refractive index of the lens material (assuming the refractive index of air is 1), and $r_1$ and $r_2$ denote the two radii of curvature of a lens, i.e., those associated with the curved surfaces on both sides of the lens. If we look at FIG. 7A for further analysis, we see that one side of the lenticular lens, the bottom, (530) is literally flat. So, the radius of curvature of that flat side is infinite and its inverse is zero. Taking $r_1$ as $r_{LENS}$, we reduce Eq. (9) to Eq. (10).

$$\frac{1}{f} = (n-1)\left(\frac{1}{r_{LENS}}\right) \quad (10)$$

Eq. (10) reveals that when the refractive index of a lenticular lens, n, is fixed, its performance is largely determined by its radius of curvature $r_{LENS}$. This suggests that the moiré problem can be addressed, while otherwise having a fairly low impact on overall lens quality, by maintaining the radius of curvature $r_{LENS}$ for the major region of the lens. Still further, as shown schematically in FIG. 7A or 7B, a 3D stereoscopic displaying device can have its lenticular lens sheet (one lens (512) shown for simplicity) attached to a carrier layer (521), which can be a structure formed of composite materials or can be a layered structure that may include a transparent film made of (for example) Polyethylene Terephthalate (PET). In the fabrication that is the subject of the present disclosure, the carrier layer is attached to an image projecting layer (not shown) with an adhesive layer (522), which can be either an optically clean adhesive (OCA) layer, a pressure sensitive adhesive (PSA), or an optically cleaned resin (OCR). When the thickness of the carrier layer, C, is much greater than the radius of curvature of lenticular lens $r_{LENS}$ the entire optically transparent lens module (i.e., lenticular lens sheet, the carrier layer and the adhesive layer) resembles a thick lens, whose behavior can be described by Eq. (11).

$$\frac{1}{f} = (n-1)\left(\frac{1}{r_1} - \frac{1}{r_2}\right) + \frac{(n-1)^2}{n} \cdot d \cdot \frac{1}{r_1} \cdot \frac{1}{r_2} \quad (11)$$

As Eq. (11) shows, when a lenticular lens is attached to an optically transparent carrier substrate that includes an adhesive layer, the equivalent thickness of the lens module, denoted d in Eq. (11), is no longer negligible. Since the carrier substrate material is essentially a transparent slab, its corresponding radius of curvature (e.g., $r_2$) will be infinite (∞), and this leads to a situation where the second term on the right of Eq. (11) is zero (i.e., $$\frac{1}{r_2} = \frac{1}{\infty} = 0).$$

Thus, according to either Eqs. (10) or (11), the optical performance of a lenticular lens sheet, a structure comprising at least one lenticular lens, one carrier layer, and an OCA/OCR adhesive layer, can be entirely characterized by the radius of curvature of its convex surface, i.e., $r_{LENS}$ Thus, the moiré image can be suppressed by adjusting the n value of the carrier layer or the adhesive, PSA, OCA, or OCR. In general, the n value of the carrier layer, with or without the additional OCA or OCR adhesive layer, will not affect the overall light refracting property of the lenticular lens body material. But, as Eq. (3) also reveals, it will affect the total internal reflection (TIR) within the lens. A carrier layer having a positive effect on moiré suppression but very little impact on crosstalk abatement is highly desirable.

(4) Performance Assessment of the Lenticular Lens as an Integrated Optical System In the previous paragraphs, we have shown how the moiré problem can be addressed by reducing the light propagation paths of light rays that have been totally internally reflected within the lenticular lens. While disclosing the advantages of this approach, we have also stated that when a light scattering layer is attached to the base of a lenticular lens, it may cause aberration problems for the overall image because the sharpness as well as the brightness of the overall image would be lowered. However, the present method attaches only a very thin layer of light scattering adhesive material to the lenticular lens, so only a slight amount of image blurring will result. As a result, a moiré free, crosstalk reduced, and high brightness 3D image rendering system can be fabricated. Note that we have said that the brightness of an image will be high when the crosstalk problem has been successfully addressed. In 3D displaying device industry, crosstalk is characterized by Eq. (12).

$$\text{crosstalk} = \frac{\text{luminance\_of\_crosstalked\_image}}{\text{luminance\_of\_desired\_image}} \quad (12)$$

Eq. (12) defines "crosstalk" in terms of the luminance of the overall image. Naturally, crosstalk should be as low as possible (e.g., <20%). When the value of crosstalk of Eq. (12) is high (e.g., >20%), even a slight misalignment between the subpixels and the lenticular lens, which could be as small as a displacement of only several μm, may cause a visible optical effect in a lenticular lens by creating crosstalk. In this situation, a common approach is to seek ways to conceal the crosstalk problem "cosmetically," by simply lowering the overall illuminating condition. In this way the crosstalk problem is temporarily alleviated, but unfortunately, it is at the expense of the brightness of the primary images. Alternatively, some approaches change the illumination sequence of the subpixels during system operation (e.g. by interlacing, multiplexing, etc.) when the crosstalk problem is persistent. This requires extra work on the driving circuitry, so that the "firing" sequence, i.e., 1, 2, 3, etc., of the subpixels shown in FIG. 1 can be altered. The present method provides a more substantive way to reduce the crosstalk phenomenon without involving lens alignment, sequence changing or dimming the entire illumination condition, as by making the illuminance of some pixels lower than two thirds of the normal value of the subpixels. In addition, and perhaps most importantly, the present method provides a comprehensive strategy derived from optical physics, allowing the choice of different adhesive materials, carrier materials, or the addition of various types of nanoparticles to the adhesive material. This cannot be easily done using prior art methods because most of the undesirable optical artifacts (e.g., crosstalk, etc.) in a 3D displaying device are associated with complex interactions having unpredictable side-effects. Using equation (12), the present invention demonstrates its excellent performance at high illumination condition, even while the lenticular lens is not slanted as in FIG. 1.

EMBODIMENTS

Embodiment 1 describes the manufacturing process of the presently disclosed lenticular lens sheet.

Embodiment 2 discloses a method to form a lens structure that augments the performance of a lenticular lens sheet (i.e., by reducing the optical_artifact data in accordance with Eq. (6)).

Embodiment 3 provides a method of fabricating a lenticular lens sheet with a light diffusing plate instead of an adhesive layer, which is especially useful for the situations that do not allow or require the use of adhesive material.

Embodiment 1

Figure 9:
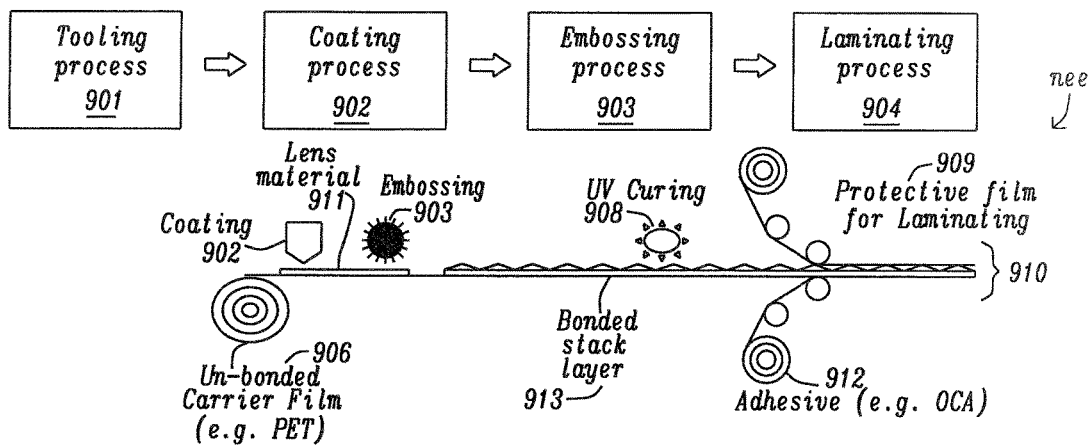
FIG. 9 shows schematically, Embodiment 1 of the present invention, which is a generic manufacturing process of the presently disclosed lenticular lens sheet.

To begin the process description of embodiment 1, we first refer to schematic FIG. 9 which shows that a typical lenticular lens sheet (e.g. 910) is made of two essential components, i.e., the lenticular lens material (911), and its carrier film (906). These two components are bonded and the lens material is embossed to form a lenticular lens sheet (910). The adhesive (912) is usually attached to the back of the lenticular lens sheet (910) during the course of the bonding process. FIG. 9 shows the process flow for manufacturing the presently disclosed lenticular lens sheet. As FIG. 9 further shows, a typical process of manufacturing the presently disclosed lenticular lens sheet comprises mold tooling (901), coating (902), embossing (i.e., lens formation) (903), and lamination (904), respectively. The material that can be used as the body of the lenticular lens (911) is preferably a polymeric material having high optical transparency, e.g., acrylic, Poly-methyl-methacrylate, (PMMA), Polyethylene Terephthalate (PET), polycarbonate (PC), or optically clear resin (OCR). During production, the lens material (911) will be formed on a carrier material (906) which is usually made of highly transparent PET, or materials with similar optical properties. The typical thickness of the carrier material is about a fraction of a mm, typically between 1 and 100 microns. The pitch, height, and radius of curvature of the individual lenticular lenses may vary in accordance with different production requirements. We have already mentioned that radii of lenticular lenses are not uncommonly 1 mm or less and the length of a lens column may be tens of centimeters, but the variety of uses to which they will be put allows for a multiplicity of dimensions. As FIG. 7B shows, the present structure requires the designation of three parameters: F, width of the lenticular lens, T, the thickness of the adhesive layer and D, the height of the lenticular lens. The adhesive layer (912), formed of optically clear adhesive (OCA) material, or optically clear resin (OCR), will have its transparency specification meeting that of an optically clear standard. The typical thickness of such an OCA layer is about 0.2 mm, but other ranges are possible.

Figure 10:
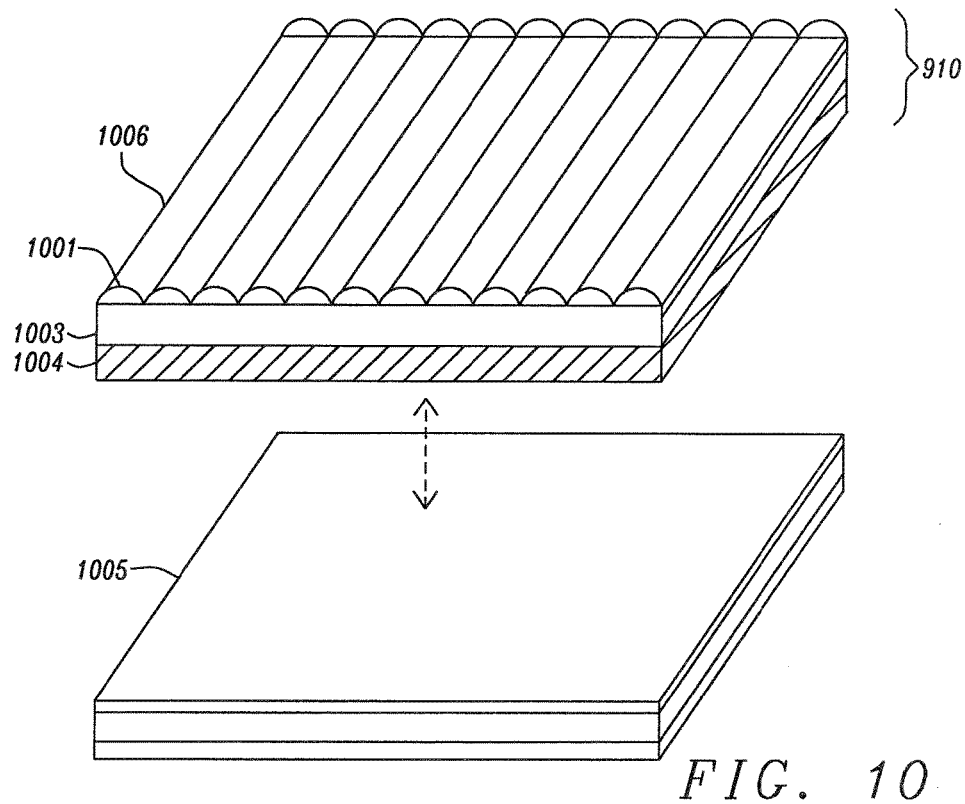
FIG. 10 shows, schematically, the process attaching a lenticular lens to a flat panel display of Embodiment 1.

As schematic FIG. 10 shows, it is the adhesive layer (1004) that attaches one of its sides to the back surface of the carrier film (1003) and uses its other side to attach to the displaying panel (1005). As FIG. 7B shows, in certain applications, an amount of nanoparticles can be blended into the adhesive layer; usually for moiré suppression purposes. When the manufacturing process begins, as shown in FIG. 9, a roll of the carrier film (906) will be loaded into the production system and subsequently unbundled as a flexible ribbon. The unbundled carrier film, in flat ribbon shape now, will go through a continuous molding process as follows. The un-bonded carrier film (906) has two sides; the side that has no adhesive is the one onto which the lens material (911) is deposited by a coating process (902). Upon the commencement of the continuous molding process, lens materials will be pre-processed (e.g., by heating, being subjected to various solutions, etc.) to prepare for the molding condition. The pre-processed lens material will then be deposited onto the carrier film. There are other methods to deposit the lens material on said carrier film. For simplicity, these alternative methods are not elaborated. The lens material is then subjected to an embossing process (903), through which the lenticular lens sheet is formed. After the embossing process, the lenticular lens sheet is subjected to a UV light curing process (908), or other curing processes appropriate to the specific material. When the embossing process is complete, the bonded stack layer (i.e., lenticular lens and carrier film; 913) is subjected to a de-molding process, followed by the lamination process (904). During the laminating process (904), the bonded stack layer (913) has an adhesive material (912) applied to its bottom surface. Concurrently, a protective film (909) is applied to the top surface of said bonded stack structure as a means of preventing the lenticular lens from being scratched or contaminated by the transportation process afterwards. Likewise, there is another process designed for adding a so called release film onto said adhesive layer, which is meant to prevent the applied adhesive material (912) from contamination during transportation process.

In order for the lenticular lens sheet, fabricated as above, to achieve the objectives of suppressing both moiré and crosstalk, the following steps, either singly or in combination, can be taken:

(1) Modify the refractive index of the adhesive material, so that more light rays can be transmitted through the adhesive material without being reflected back by the interface between the lenticular lens sheet and adhesive material.

(2) Add nanoparticles to the adhesive material, so that transmitted light rays in the adhesive material are subjected to a multiple scattering effect, making the overall intensity of the secondary reflected light rays more uniform.

Figure 8A:
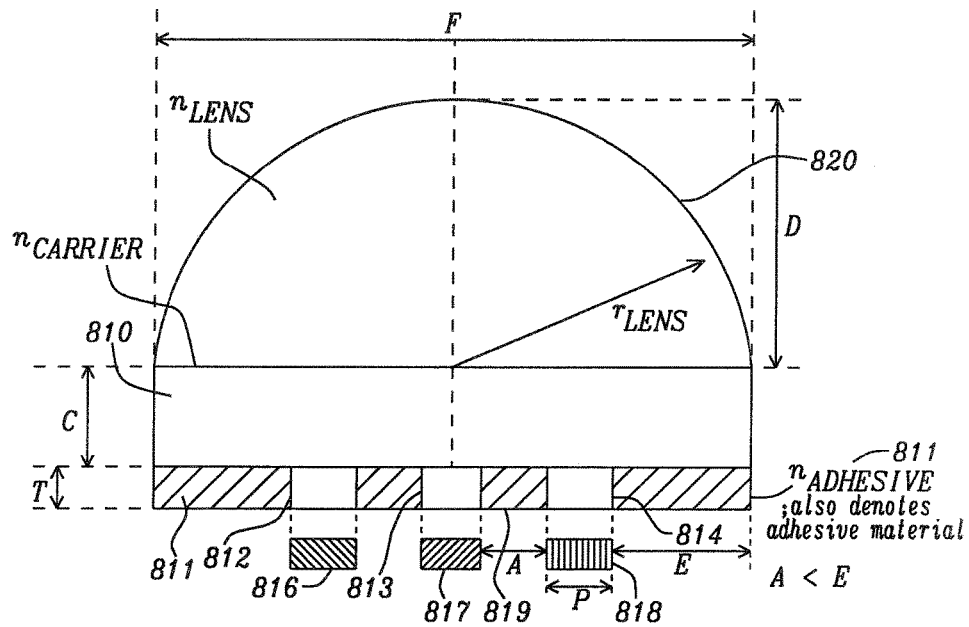
FIG. 8A shows schematically, the generic design rule of having a plurality of light guides formed on its bottom plane.
Figure 8B:
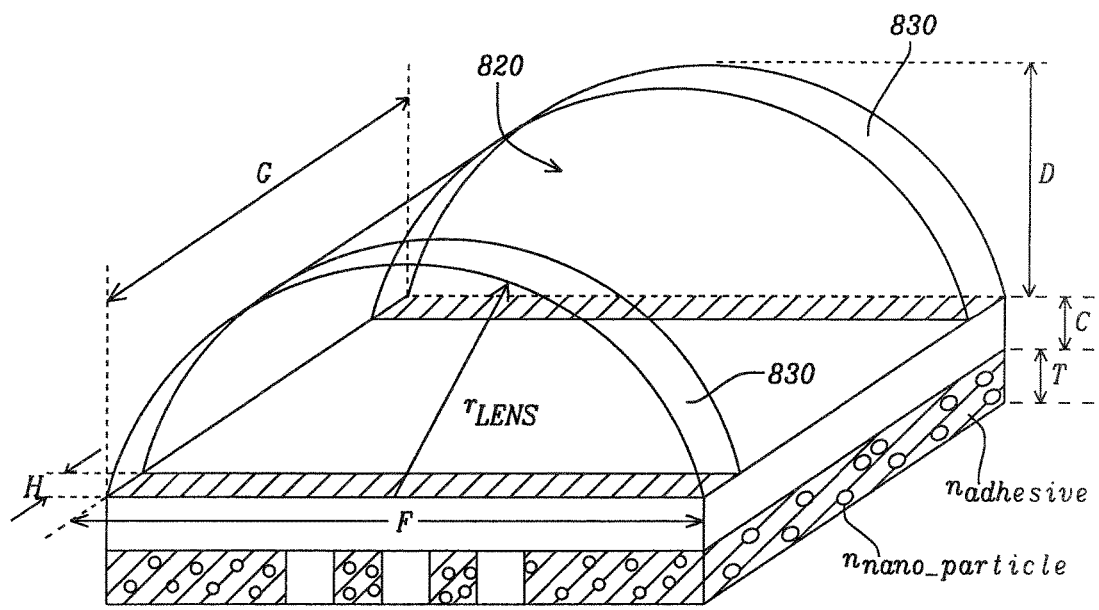
FIG. 8B shows schematically, the generic design rule of having a plurality of light guides formed on its bottom plane, the adhesive material is blended with nano-particles for augmented light diffusing effect of the secondary reflected light rays.

(3) Fabricate the lenticular lens in a shape resembling that of a multi-segmented "bamboo" structure. As FIG. 7B shows, this means that the total length (e.g., longitudinal or Y dimension) of a lenticular lens column can be cut into several segments. In this case, the value of parameter G of FIG. 7B (i.e. length of a segment of a lenticular lens that is formed as a bamboo structure) is smaller than that of N in FIG. 3C (i.e., total length of a lenticular lens column) and is also shown in FIG. 8B. Still further, thin layers with their refractive indexes higher than that of the lenticular lens material can be deposited on the two sides of the bamboo structure that severed the segments to form the lenticular lens island whose length is N. This additional layering between segments (820) is shown as (830) in FIG. 8B.

Figure 14:
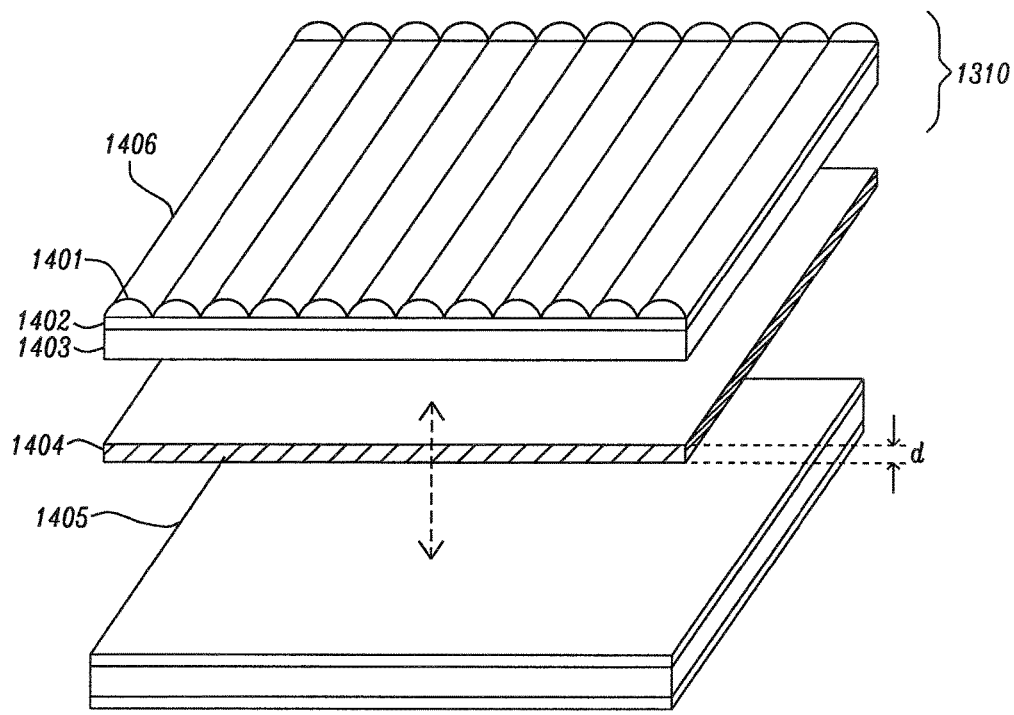

The above steps can be combined for a synergized effect. Modification of the steps is allowed for the optimized performance of the final product. In another aspect of the method, as FIG. 14 shows schematically, a material spacer layer (1404) or an air gap used as a spacer layer (1404) can be added to the displaying device as a means of increasing the observable viewing distance (OVD, i.e., item 516 in FIG. 5A). Using the knowledge acquired from thick lens analysis (Eq. 11), the rendering of a moiré free 3D stereoscopic image will not be affected by adding a spacing parameter d to Eq. (11). But the OVD may be increased by increasing d. Hence, one can choose a slab of material at a transparency level satisfactory to the system requirement of the present invention; by inserting such a slab to the system, the OVD is substantially increased. Materials suitable for such a spacing purpose include PC, PMMA, glass, or optically clear resin (OCR), etc. Still further, one can designate different regions in the layer for serving different purposes, i.e., the area that directly faces the subpixels is made of highly transparent materials, whereas the remaining area is made of dielectric material with a specific range of refractive index value and blended with nanoparticles. Further, the refractive index value may be deliberately controlled for the proper Brewster's angle. Detailed process and device structure is provided in embodiment 2.

Embodiment 2

Embodiment 2 (illustrated in FIG. 8A and FIG. 12) discloses a method and structure which adds tiny "light guides" to the back plane (810) of the lens structure (820). Here "front plane" denotes the side carrying the embossed lenticular lens body (820), "back plane" denotes the opposite side immediately adjacent to the carrier film (810), which has thickness C. FIG. 8A schematically shows the appropriate general design rule for fabricating such a lenticular lens sheet. Note that there is a plurality of light guides, shown in FIG. 8A as (812, 813, 814) and shown as open spaces (1207) in FIG. 12, being disposed along the widthwise direction but running in the longitudinal direction (Y-direction of FIG. 3A) through the surrounding matrix of the adhesive material (811) that fills spaces separating the light guides. These light guides are aligned with the subpixels underneath them, (i.e., 816, 817, 818) to allow light rays emitted by the respective subpixels to pass through (be guided by them) relatively easily. The remaining regions that separates the light guides laterally is filled with the adhesive materials (shown as (811) in FIG. 8A and as (1204) in FIG. 12), whose refractive index is controlled at a value denoted as $n_A$. When the refractive index $n_A$ is controlled so that most of the first reflection light rays generated by the lenticular lens (820) are transmitted through the guides with little reflecting effect, the moiré image problem will be suppressed because the black matrix surrounding the subpixels (816, 817, 818) will play a diminished role in affecting the nearly absent reflections. In addition, because the refractive index value of the light guide is higher than that of the surrounding adhesive material, light rays that are emitted by the subpixels will enter the body of the lenticular lens sheet by way of the light guides without an appreciable light dispersion effect. As a consequence, a high quality, moiré free 3D stereoscopic image is generated.

Figure 11:
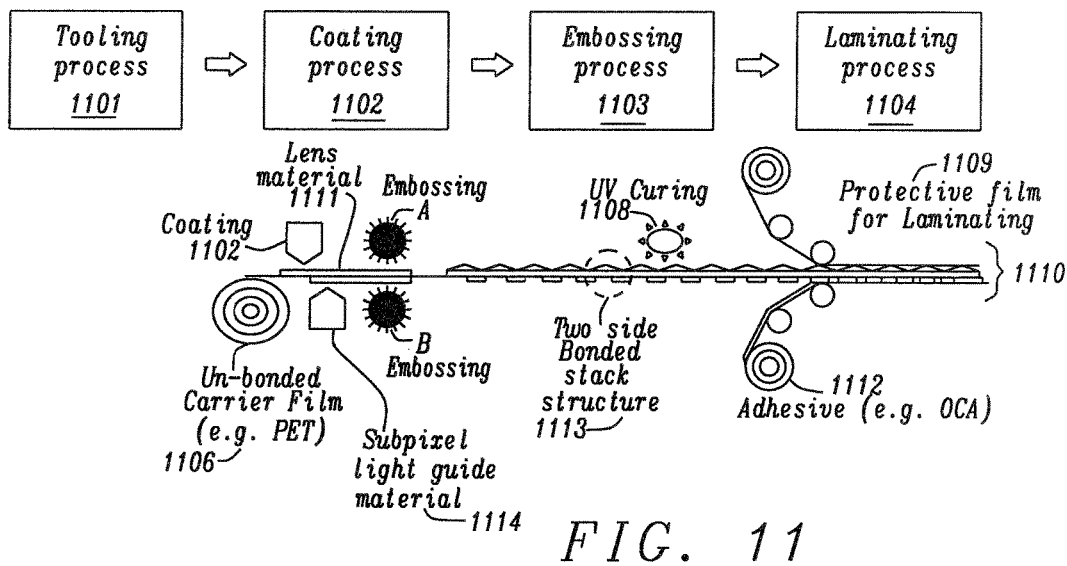
FIG. 11 shows schematically, Embodiment 2 of the present invention, which is a manufacturing process of the presently disclosed lenticular lens sheet having a plurality of light guides attached to its bottom plane.
Figure 12:
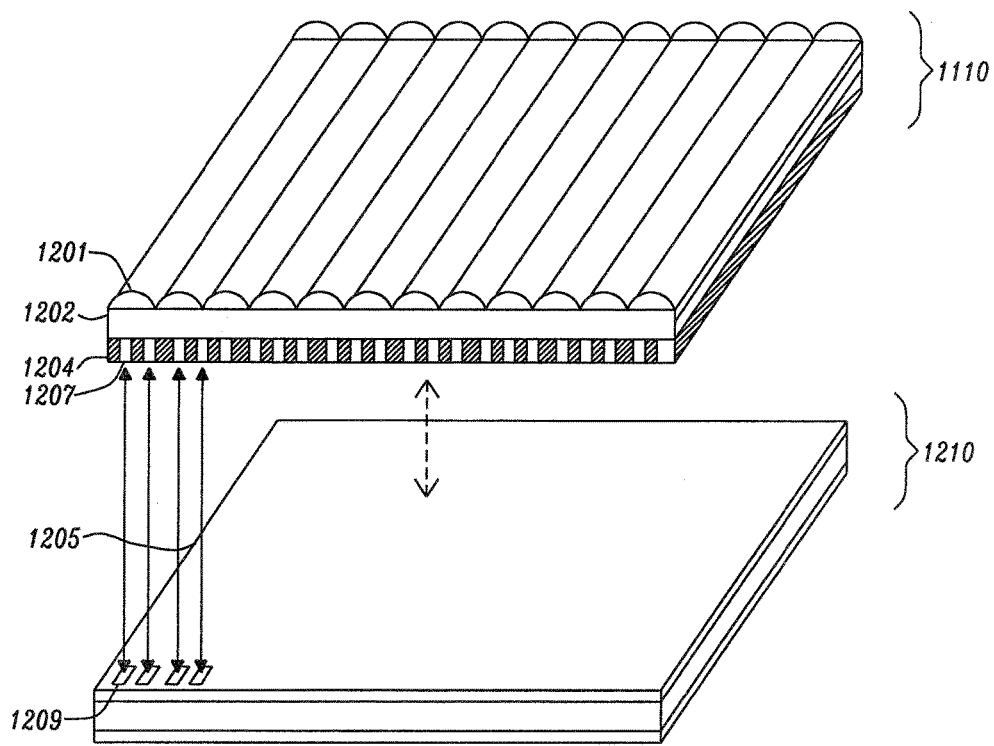
FIG. 12 shows schematically, the process of attaching a lenticular lens of Embodiment 2, fabricated by the processing steps described by FIG. 11, to a flat panel display.
Figure 13:
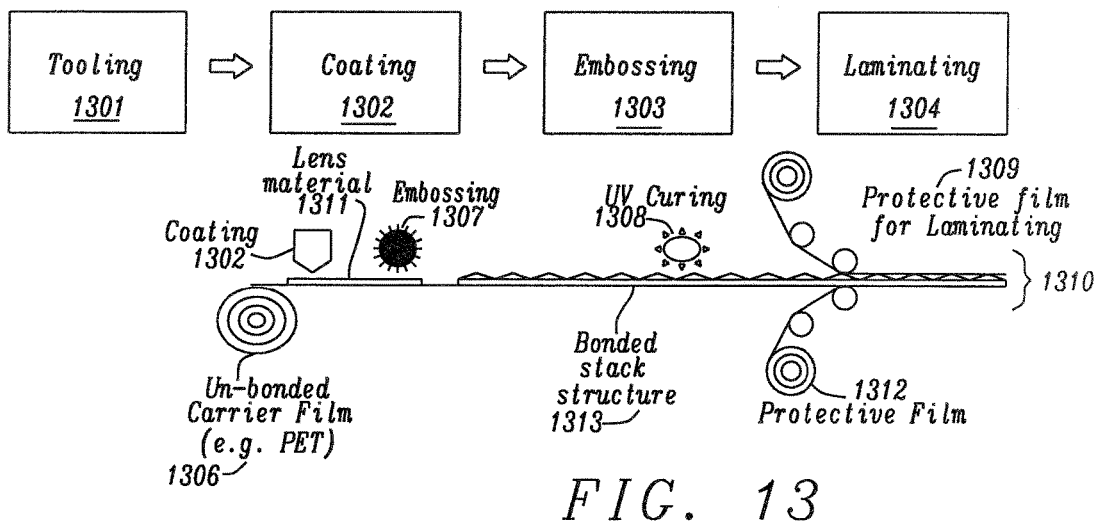
FIGS. 13 and 14 show schematically, the fabrication and structure of Embodiment 3, which inserts a light diffusing plate (1404) between a presently disclosed lenticular lens sheet and a flat panel display, so there is no need to add the adhesive layer to the lenticular lens sheet.

The manufacturing process of the lenticular lens disclosed in Embodiment 2 is depicted in FIG. 11 and FIG. 12. Comparing FIG. 11 to FIG. 9, Embodiment 2 is seen to be different from Embodiment 1 by the formation of its additional subpixel light guide materials (1114) that will be used to structure the adhesive matrix (1112). The basic process steps (1101)-(1104) of FIG. 11 are substantially the same as (901)-(904), but are now applied to different materials and create a top and bottom embossed structure. First, embossing process (A) creates the shapes of the lenticular lenses on top of the carrier layer (1106), while embossing process (B) creates the light guides using subpixel light guide material (1114) beneath the carrier layer. Thus, in applying the embossing process (B) to create the light guides, a two sided bonded stack structure (1113) is formed. Then, the side with the embossed light guide structure (B) will be further deposited with an adhesive layer (1112) whose refractive index, microstructure constituents, etc., are different than that of the embossed structure (B). The finished product (1110), comprising embossed light guides whose separations are filled with adhesive material from layer (1112) will look like the adhesive layer (811) of FIG. 8A.

Referring to the resulting structure of FIG. 12, there is seen schematically that upon attaching the finished product of the two-sided embossed lenticular lens film (1110), comprising lens (1201), carrier layer (1202) and adhesive/light guide structure (1204), onto a flat panel display (1210), each of the respective embossed light guide structures as denoted by (1207) in FIG. 12, will be properly aligned along the respective subpixels (i.e., 1209, etc.) of the flat panel display (1210). The regions on the lenticular lens sheet that do not contact the subpixels directly will contact the adhesive materials (e.g., 1204). The above features establish the fundamental difference between embodiments 1 and 2. Otherwise, the steps for forming the entire lenticular lens sheet of the two embodiments are the same, i.e., tooling process (901, or 1101), coating process (902, or 1102), embossing process (903, 1103), and laminating process (904, or 1104), respectively. Materials suitable for forming the light guide include PC, PMMA, glass, or optically clean resin (OCR), etc. Still further, one can simply specify that the adhesive be made of the dielectric material having a specific range of refractive index values, blended with a certain density of nanoparticles of specific size and optical properties. The refractive index value of the dielectric material is deliberately controlled for the optimized effects of Brewster's angle transmission.

Embodiment 3

In this embodiment, whose structure is illustrated schematically in FIG. 14, a light diffusing plate (1404) of thickness d, is used in lieu of the adhesives applied in embodiments 1 or 2 (i.e., 1004, 1204) to contact the display layer (1405). In practice, there are certain situations that do not permit applying an adhesive layer or using other forms of permanent bonding on a flat panel display, such as when the lenticular lens sheet will be removed from the display subsequent to the completion of a 3D stereoscopic image rendering process. In such a situation, using a light diffusing plate instead of an adhesive layer is more desirable. In addition, the OVD of a system using the present lenticular lens sheet can be better controlled by the thickness of light diffusing plate (1404) more easily and more accurately as compared to the corresponding control provided by the thickness of the light guide (e.g. (1207) or (1208) in FIG. 12) or adhesive layers (e.g., 1204 in FIG. 12). Still further, one may blend optically active nanoparticles within the light diffusing plate, so that the intensity of the secondary reflected light rays will be averaged out to produce a steady background illuminance, leading to effective suppression of the moiré image.

As is understood by a person skilled in the art, the present description is illustrative of the present disclosure rather than limiting of the present disclosure. Revisions and modifications may be made to methods, materials, structures and dimensions employed in forming and using a 3D stereoscopic image rendering device employing a lenticular lens sheet that suppresses the problems of moiré pattern formation and reduces the related problem of crosstalk, while still providing such a device and its method of fabrication in accord with the spirit and scope of the present disclosure as defined by the appended claims.

What is claimed is:

1. 3D (three-dimensional) stereoscopic image rendering system comprising:
  an image projecting layer disposed in an X-Y plane, said image projecting layer comprising a black matrix-framed geometrical array of subpixels capable of emitting light;
  a lenticular lens sheet formed over said image projecting layer, wherein said lenticular lens sheet comprises a multiplicity of parallel, contiguous and substantially identically shaped lenticular lenses having bases that are flat and co-planar, wherein said lenticular lenses are capable of projecting images generated by light emitted from said subpixels into left and right directions to create a visually perceivable 3D stereoscopic image at an optical vertical distance, OVD, above said lens sheet;
  wherein each said lenticular lens is formed of a lens material having an index of refraction $n_L$ and wherein each said lenticular lens is shaped as a uniform semi-cylinder of length G having a flat base and convex cap, whose longitudinal axis extends for said length G along a Y-direction and, in a transverse X-Z plane, has a convex cross-section of diameter F, or wherein each said lenticular lens is shaped as a similarly aligned segmented semi-cylinder of flat base, each of whose segments may differ in shape or optical properties and may be separated from an adjacent segment by a spacer layer; and
  a carrier layer of thickness C formed on said co-planar flat base of said lenticular lens sheet; and wherein
  a multi-layered structure is, formed on said carrier layer and interposed between said carrier layer and said image projecting layer, wherein said multilayered structure includes either a multi-component adhesive layer of thickness T comprising a matrix of adhesive material having an index of refraction $n_A$ capable of fastening said multilayered structure to said image projecting layer; or wherein
  said multi-layered structure includes a plate formed of a light diffusing material that contacts said image projecting layer but is not fastened to it; whereby,
  as a result of a choice of the values of $n_L$ and $n_A$,
  when subpixels of said image projecting layer are emitting light, the intensity of multiple, diffuse, internally-reflected light rays in said lenticular lenses, propagating along the lengthwise Y direction within each of said lenticular lenses or in the transverse X direction between said lenticular lenses, is eliminated or reduced; and
  as a result of said elimination or reduction in intensity, there is a corresponding elimination or reduction in variations in intensity of leakage radiation produced at regions of varying reflectivity longitudinally distributed along said lenticular lens base together with the moiré patterns that are produced by said variations in intensity; and
  as a result of said reduction or elimination of said diffuse internally-reflected light propagating transversely between said lenticular lens elements, leakage of said transversely propagating light that is perceived as crosstalk between left and right projected images is reduced or eliminated.

2. The 3D (three-dimensional) stereoscopic image rendering system of claim 1 wherein said diffuse multiply internally-reflected light propagating along the lengthwise direction within said lenticular lenses is eliminated or reduced by altering the conditions for total internal reflection within said lenticular lenses.

3. The 3D (three-dimensional) stereoscopic image rendering system of claim 2 wherein said diffuse multiply internally-reflected light propagating along the lengthwise direction within said lenticular lenses is eliminated or reduced by changing the index of refraction, $n_L$ of the lens material in accordance with the dimensions of each of said lenticular lenses.

4. The 3D (three-dimensional) stereoscopic image rendering system of claim 1 wherein said diffuse multiply internally-reflected light propagating along the lengthwise direction within said lenticular lenses is eliminated or reduced by altering the Brewster angle conditions for reflection of a polarized ray from a layer contacting the base surface of said lenticular lenses.

5. The 3D (three-dimensional) stereoscopic image rendering system of claim 1 wherein said diffuse multiply internally-reflected light propagating along the lengthwise direction within said lenticular lenses is reduced by altering the optical properties of said adhesive layer through the admixture of a certain density of nanomaterials into said adhesive layer, wherein optical scattering by said admixture reduces the intensity of said diffused light and makes said diffused light more isotropic in its distribution.

6. The 3D (three-dimensional) stereoscopic image rendering system of claim 1 wherein said diffuse multiply internally-reflected light propagating along the transverse direction between said lenticular lenses is eliminated or reduced by an amount capable of improving a relative brightness of left and right directed images projected by said lenticular lens sheet and thereby enhancing the stereoscopic visual effect.

7. The 3D (three-dimensional) stereoscopic image rendering system of claim 6 wherein said image is sharpened by the addition of an optical material layer between said image projecting layer and said lenticular lens sheet that eliminates internally reflected rays and thereby sharpens the primary image-producing rays by reducing background illuminance.

8. The 3D (three-dimensional) stereoscopic image rendering system of claim 1 wherein said diffuse multiply internally-reflected light propagating transversely through said lenticular lens elements is eliminated or reduced by an amount suitable for reducing crosstalk by addition of an appropriate density of nanoparticles to said adhesive layer, wherein said density is a minimal density capable of eliminating only first and second internal reflections.

9. The 3D (three-dimensional) stereoscopic image rendering system of claim 8 wherein said diffuse multiply internally-reflected light propagating along the transverse direction across said lenticular lens elements is eliminated or reduced by altering the conditions for total internal reflection within said nanoparticles admixed into the adhesive material.

10. The 3D (three-dimensional) stereoscopic image rendering system of claim 9 wherein said diffuse multiply internally-reflected light propagating along the transverse direction across said lenticular lenses is eliminated or reduced by altering the conditions for total internal reflection within nanoparticles admixed into the adhesive matrix by choosing the refractive index of the nanoparticles to be higher than that of the adhesive material ($n_{nano\_particle} > n_{adhesive}$).

11. The 3D (three-dimensional) stereoscopic image rendering system of claim 1 wherein said refractive index, $n_L$, of said lens material is lower than said refractive index $n_A$ of said adhesive layer.

12. The 3D (three-dimensional) stereoscopic image rendering system of claim 1 wherein said diffuse multiply internally-reflected light propagating along the longitudinal direction within said lenticular lenses is eliminated or reduced by forming said lenticular lenses in a bamboo-like configuration where said lenticular lenses are formed as segments of index of refraction $n_1$ and length N and separated from each other by contiguous thinner segments of length H having an index of refraction $n_2$ where $n_2$ is greater than $n_1$.

13. The 3D (three-dimensional) stereoscopic image rendering system of claim 1 wherein characteristics of said diffuse multiply internally-reflected light propagating along the lengthwise and transverse directions within said lenticular lens sheet are changed by altering the optical and physical properties of said adhesive layer through the formation of a geometric pattern of longitudinally directed light guides through said adhesive layer, wherein said light guides contact subpixels of said image forming array and preferentially transmit stray light generated by said subpixels, whereby said light guides reduce or eliminate the multiple reflections in the longitudinal direction of said lenticular lenses that are responsible for moiré patterns and multiple reflections in the transverse direction that produce crosstalk.

14. The 3D (three-dimensional) stereoscopic image rendering system of claim 1 wherein said adhesive layer is a layer of pressure sensitive adhesive (PSA), Poly-methyl-methacrylate, (PMMA), or optically clear adhesive (OCA), formed to a thickness of between approximately 1 micron and 100 microns.

15. The 3D (three-dimensional) image rendering system of claim 5 wherein said nanoparticles are particles of glass, polyethylene, polypropylene, poly-carbonate (PC), Poly-methyl-methacrylate, (PMMA), Polyethylene Terephthalate (PET), $Al_2O_3$, $SiO_2$ or $TiO_2$ and are admixed in said adhesive matrix with a density of 30% to 95% by volume.

16. The 3D (three-dimensional) image rendering system of claim 8 wherein said nanoparticles are particles of polyethylene, polypropylene, poly-carbonate (PC), Poly-methyl-methacrylate (PMMA), Polyethylene Terephthalate (PET), $Al_2O_3$, $SiO_2$ or $TiO_2$ and are admixed in said adhesive matrix with a density of 30% to 95% by volume.

17. The 3D (three-dimensional) stereoscopic image rendering system of claim 1 wherein a light diffusing plate replaces said adhesive layer or is affixed to said adhesive layer and removably contacts said image-forming layer.

18. The 3D (three-dimensional) stereoscopic image rendering system of claim 1 wherein said carrier layer is a layer of Polyethylene Terephthalate (PET), of from 50 µm to 250 µm in thickness.

19. The 3D (three-dimensional) stereoscopic image rendering system of claim 16 wherein said intermixed nanoparticles are of diameter between approximately 0.01 µm and 10 µm.

20. The 3D (three-dimensional) stereoscopic image rendering system of claim 19 wherein the thickness of said adhesive layer is between approximately 1 µm and 75 µm.

* * * * *